Oct. 2, 1962 E. I. BLUMENTHAL ETAL 3,056,947
INFORMATION TRANSLATING APPARATUS
Filed March 31, 1952 17 Sheets-Sheet 1

INVENTORS
HERBERT F. WELSH
JOHN P. ECKERT, JR.
EDWIN I. BLUMENTHAL
BY George V. Eltgroth
ATTORNEY INVENTORS
HERBERT F. WELSH
JOHN P. ECKERT, JR.
EDWIN I. BLUMENTHAL
BY George V. Eltgroth
ATTORNEY Oct. 2, 1962 E. I. BLUMENTHAL ET AL 3,056,947
INFORMATION TRANSLATING APPARATUS
Filed March 31, 1952 17 Sheets-Sheet 3

INVENTORS
HERBERT F. WELSH
JOHN P. ECKERT, JR.
EDWIN I. BLUMENTHAL
BY
ATTORNEY

Oct. 2, 1962 E. I. BLUMENTHAL ET AL 3,056,947

INFORMATION TRANSLATING APPARATUS

Filed March 31, 1952 17 Sheets-Sheet 4

INVENTORS
HERBERT F. WELSH
JOHN P. ECKERT, JR.
EDWIN I. BLUMENTHAL

BY [signature]

ATTORNEY

INFORMATION TRANSLATING APPARATUS

Filed March 31, 1952 17 Sheets-Sheet 5

INVENTORS
HERBERT F. WELSH
JOHN P. ECKERT, JR.
EDWIN I. BLUMENTHAL
BY
ATTORNEY

INVENTORS
HERBERT F. WELSH
JOHN P. ECKERT, JR.
EDWIN I. BLUMENTHAL
BY
George V. Eltgroth
ATTORNEY

INFORMATION TRANSLATING APPARATUS

Filed March 31, 1952 17 Sheets-Sheet 7

INVENTORS
HERBERT F. WELSH
JOHN P. ECKERT, JR.
EDWIN I. BLUMENTHAL
BY George V. Eltgroth
ATTORNEY Oct. 2, 1962 E. I. BLUMENTHAL ETAL 3,056,947

INFORMATION TRANSLATING APPARATUS

Filed March 31, 1952 17 Sheets-Sheet 8

INVENTORS
HERBERT F. WELSH
JOHN P. ECKERT, JR.
EDWIN I. BLUMENTHAL

BY

ATTORNEY

INVENTORS
HERBERT F. WELSH
JOHN P. ECKERT, JR.
EDWIN I. BLUMENTHAL
BY
ATTORNEY

BY

INVENTORS
HERBERT F. WELSH
JOHN P. ECKERT, JR.
EDWIN I. BLUMENTHAL

ATTORNEY

INFORMATION TRANSLATING APPARATUS

INVENTORS
HERBERT F. WELSH
JOHN P. ECKERT, JR.
EDWIN I. BLUMENTHAL
BY George V. Eltgroth
ATTORNEY

INFORMATION TRANSLATING APPARATUS

Filed March 31, 1952 17 Sheets-Sheet 12

INVENTORS
HERBERT F. WELSH
JOHN P. ECKERT, JR.
EDWIN I. BLUMENTHAL
BY George V. Eltgroth
ATTORNEY INVENTORS
HERBERT F. WELSH
JOHN P. ECKERT, JR.
EDWIN I. BLUMENTHAL
BY [signature]
ATTORNEY Oct. 2, 1962 E. I. BLUMENTHAL ETAL 3,056,947

INFORMATION TRANSLATING APPARATUS

Filed March 31, 1952 17 Sheets-Sheet 14

INVENTORS
HERBERT F. WELSH
JOHN P. ECKERT, JR.
EDWIN I. BLUMENTHAL

BY [signature]

ATTORNEY

INVENTORS
HERBERT F. WELSH
JOHN P. ECKERT, JR.
EDWIN I. BLUMENTHAL
BY
[signature]
ATTORNEY Oct. 2, 1962 E. I. BLUMENTHAL ETAL 3,056,947

INFORMATION TRANSLATING APPARATUS

Filed March 31, 1952 17 Sheets-Sheet 16

*INVENTORS*
HERBERT F. WELSH
JOHN P. ECKERT, JR.
EDWIN I. BLUMENTHAL

BY

[signature]
ATTORNEY

INVENTORS
HERBERT F. WELSH
JOHN P. ECKERT, JR.
EDWIN I. BLUMENTHAL
BY
George [signature]
ATTORNEY United States Patent Office 3,056,947

Patented Oct. 2, 1962

3,056,947

INFORMATION TRANSLATING APPARATUS

Edwin I. Blumenthal, Philadelphia, John Presper Eckert, Jr., Gladwyne, and Herbert F. Welsh, Philadelphia, Pa., assignors, by mesne assignments, to Sperry Rand Corporation, New York, N.Y., a corporation of Delaware

Filed Mar. 31, 1952, Ser. No. 279,714
34 Claims. (Cl. 340—172.5)

Figure 2:
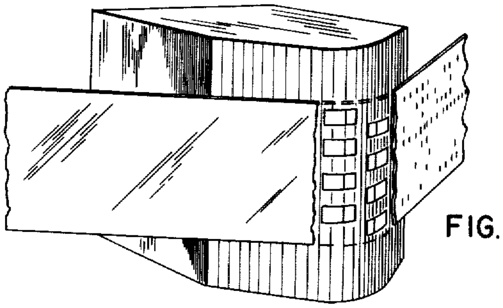

This invention relates to an electrical system uniquely responding to coded combinations and more particularly to such an electrical system having the property of transcribing of coded combinations in one form to coded combinations in a different form.

The invention is of general utility in a computing system wherein information is received, recorded and issued at speeds capable only by electronically-operated apparatus. Such a system conveniently employs coded combinations in the binary form to represent the information.

Accordingly, one of the principal objects of the invention is to provide electrical apparatus to convert information from one form into a binary code form.

Another object of the invention is to provide electrical apparatus to convert information from punched cards to a binary code form.

Another object of the invention is to provide electrical apparatus to convert information from punched cards to a binary code form and to provide a magnetic recording thereof.

Another object of the invention is to provide electrical apparatus to convert information from punched cards to a binary code form by reading the information from the punched cards item by item.

Another object of the invention is to provide electrical apparatus to convert information from punched cards to a binary code form and to detect improper punch code combinations.

Another object of the invention is to provide electrical apparatus to convert information from punched cards to a binary code form and to provide a magnetic tape recording thereof which will suspend recording and card feed during portions of tape which cannot record signals reliably.

Another object of the invention is to provide electrical apparatus to convert information from punched data carriers to a binary code form and to provide a tape recording thereof on which a first serially recorded group of digits contains the information from a data carrier, a second serially recorded group of digits contains signals independent of information derived from the data carrier, and the final digit space indicates whether or not any errors were detected in the data.

Another object of the invention is to provide electrical apparatus to convert information from punched data carriers to a binary code form and to provide a tape recording thereof on which a first predetermined quantum of information is termed a block and in which a space between blocks is inserted automatically by inhibiting the feeding of information corresponding to a second predetermined quantum of information.

Another object of the invention is to provide electrical apparatus to convert information from punched cards to a binary code form which will stop operation if the number of cards in the output bin exceeds a certain limit.

Another object of the invention is to provide electrical apparatus to convert information from punched data carriers to a binary code form and to provide a tape recording thereof which stops the tape feeding and data sensing after a predetermined number of blocks have been recorded.

Figure 1:
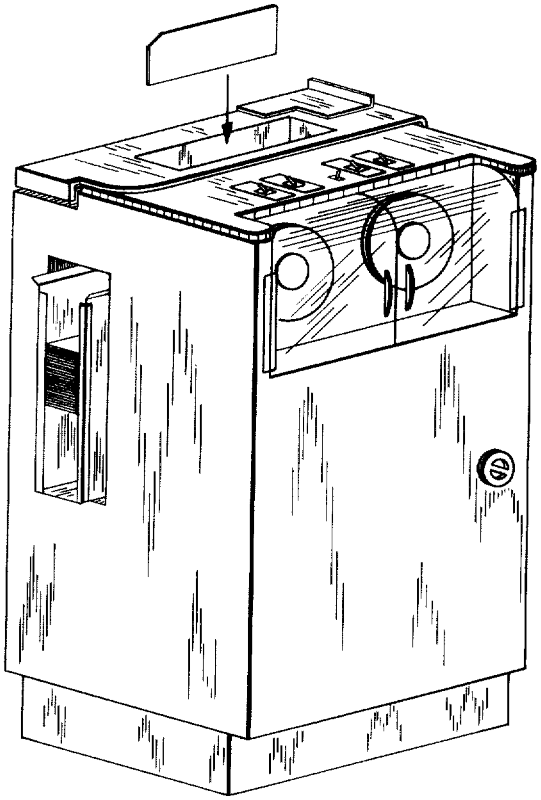
Figure 3:
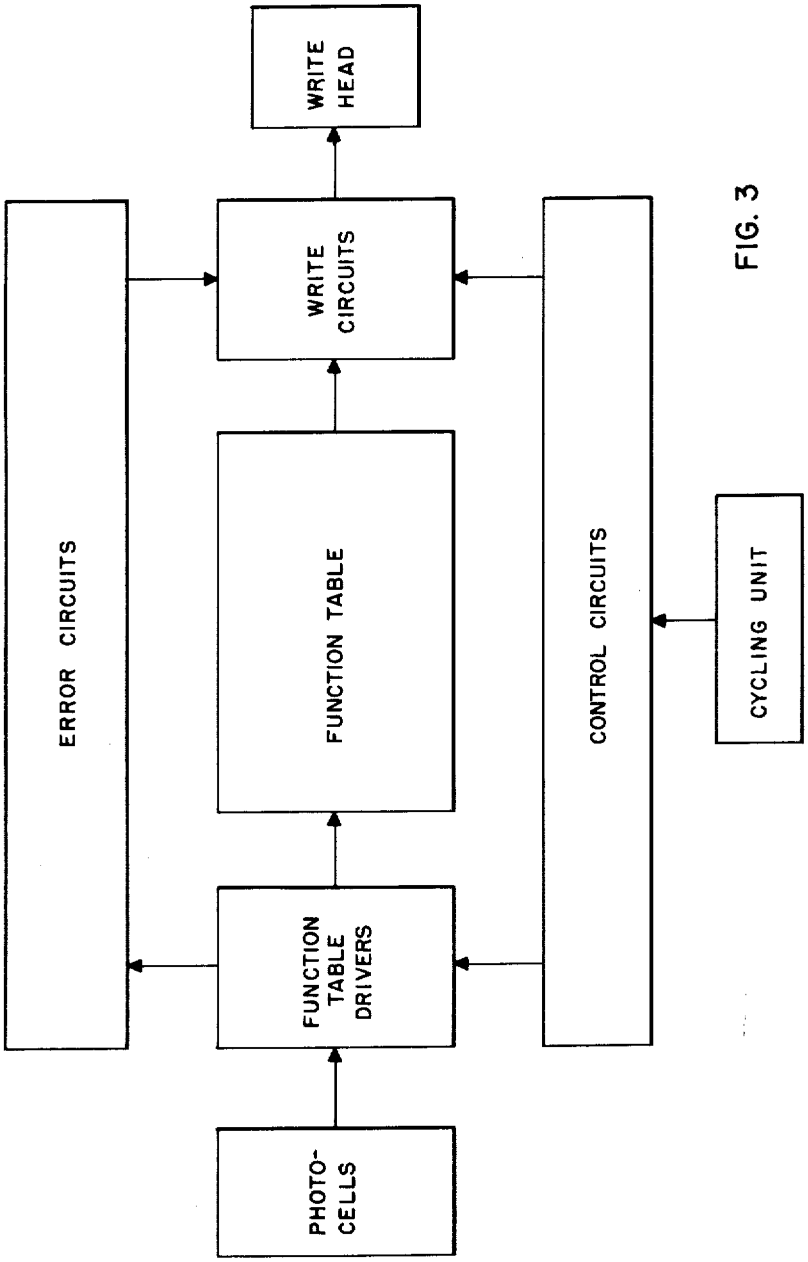
Figure 4:
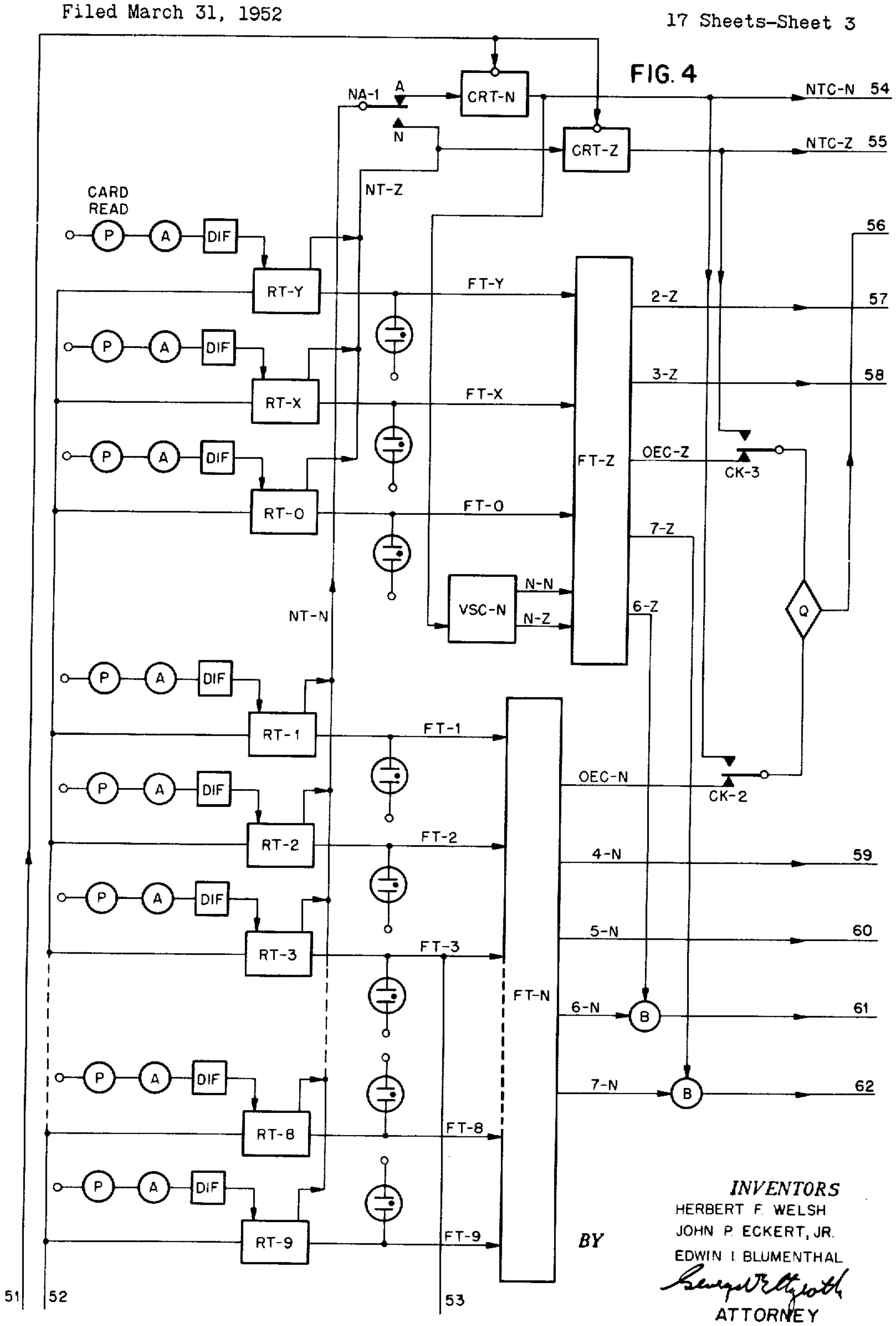
Figure 5:
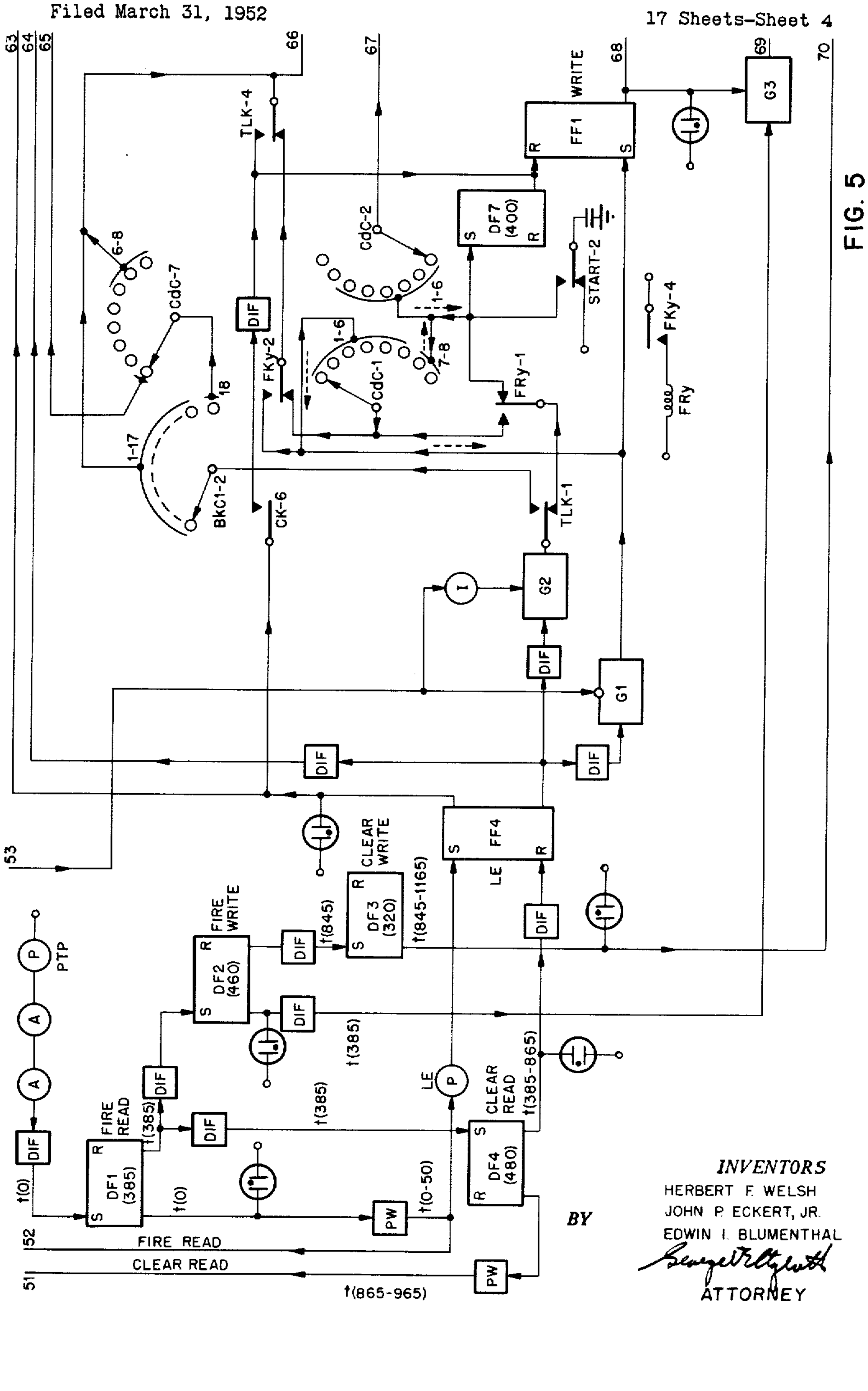
Figure 6:
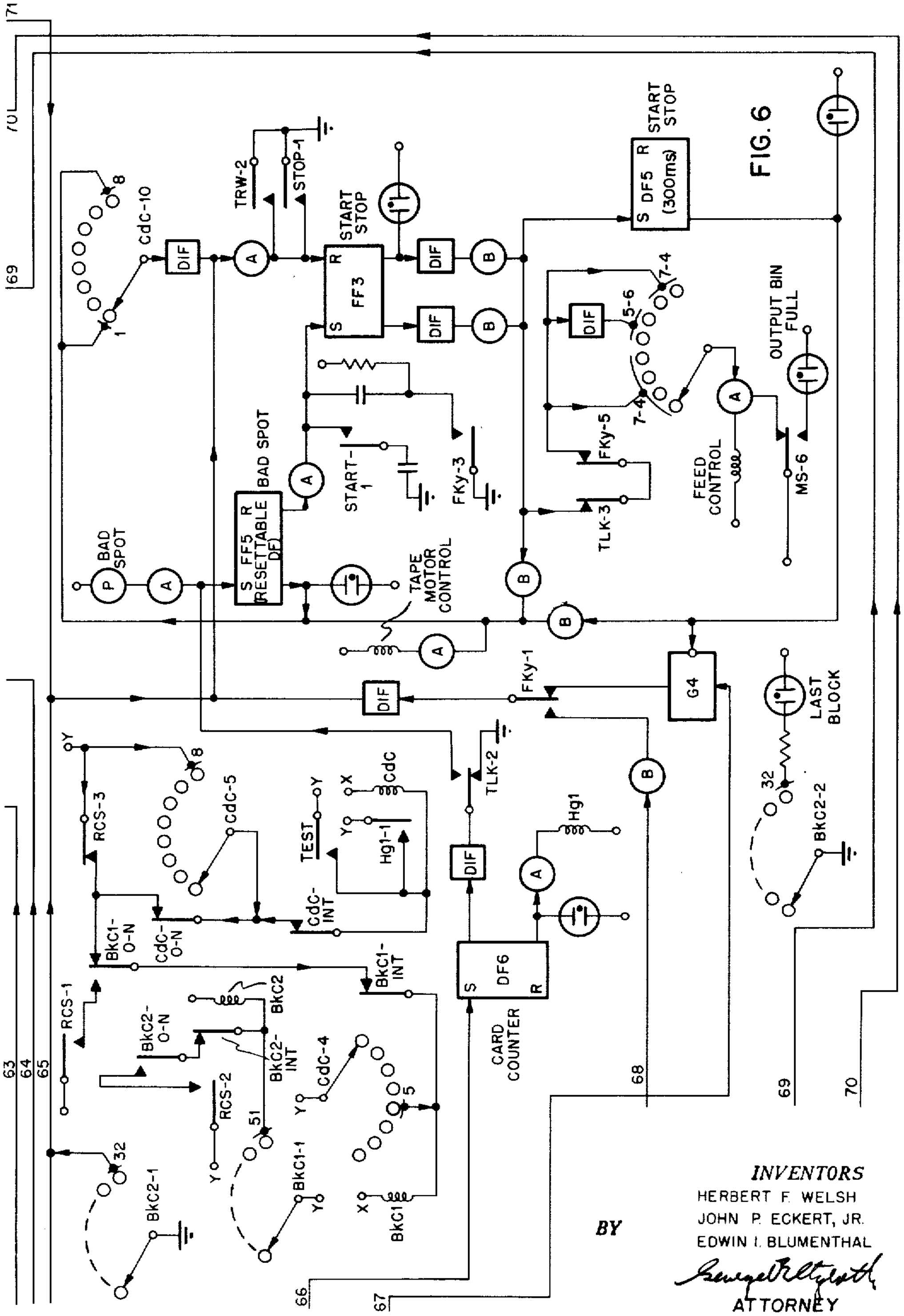
Figure 7:
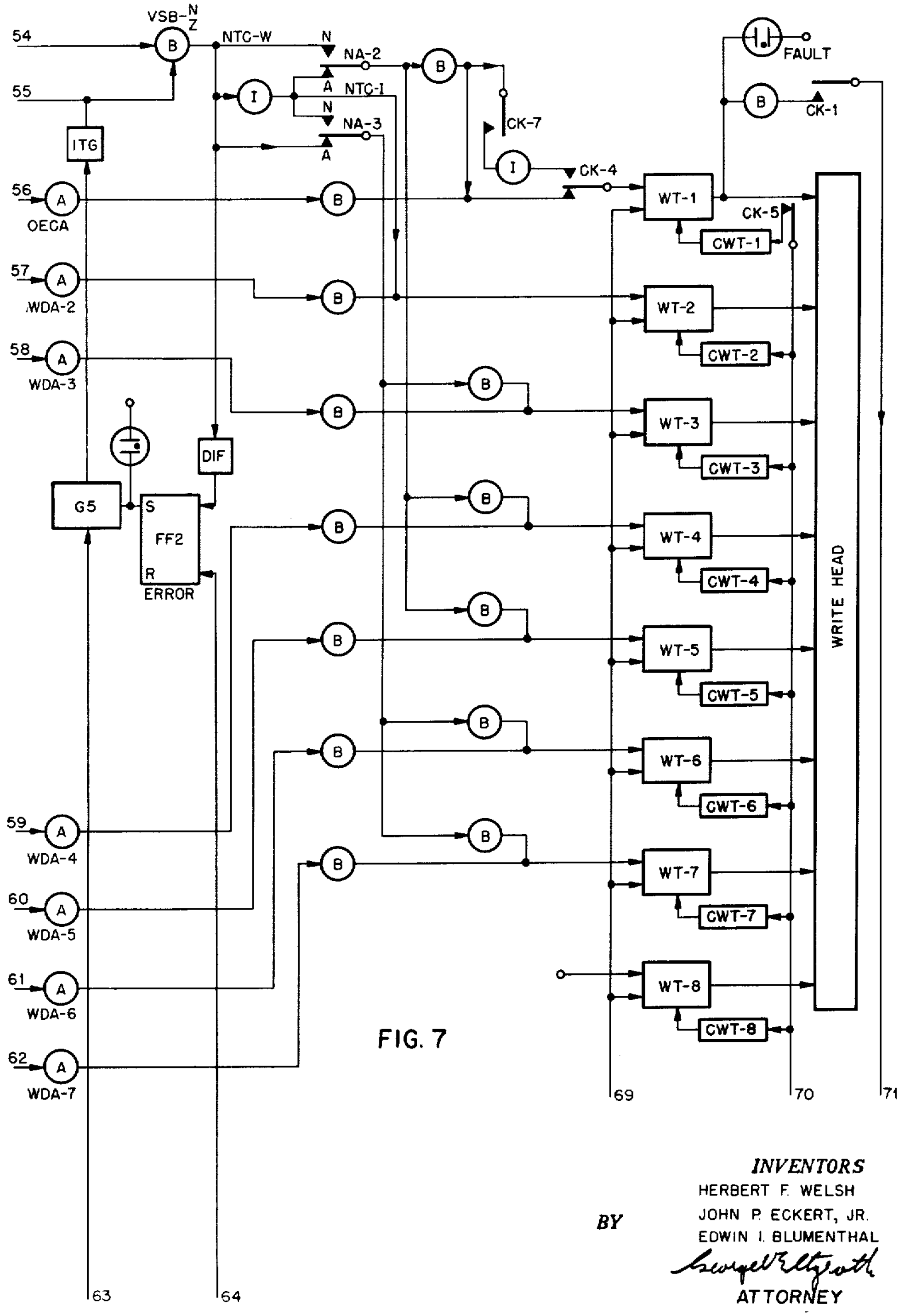
Figure 8:
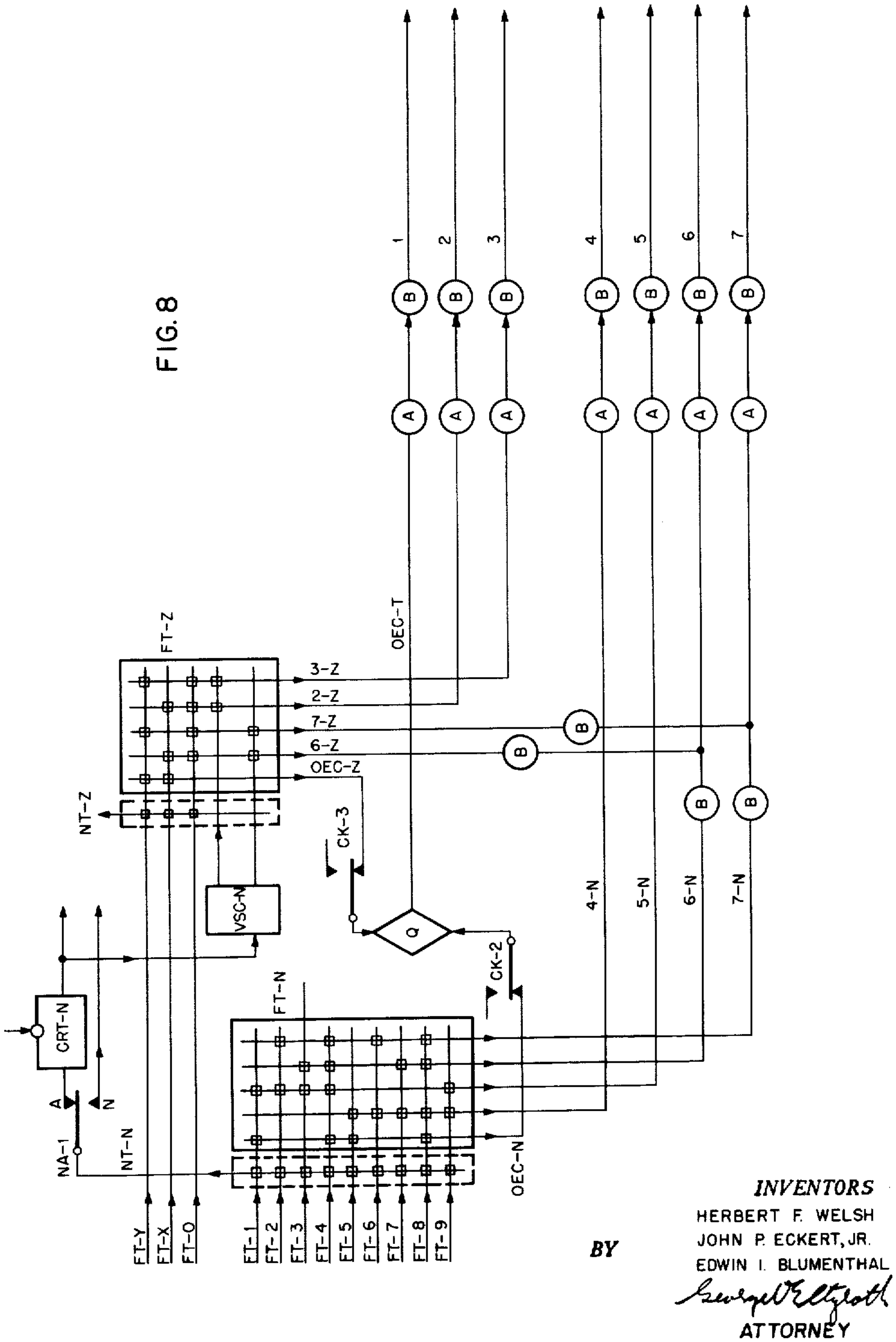
Figure 9:
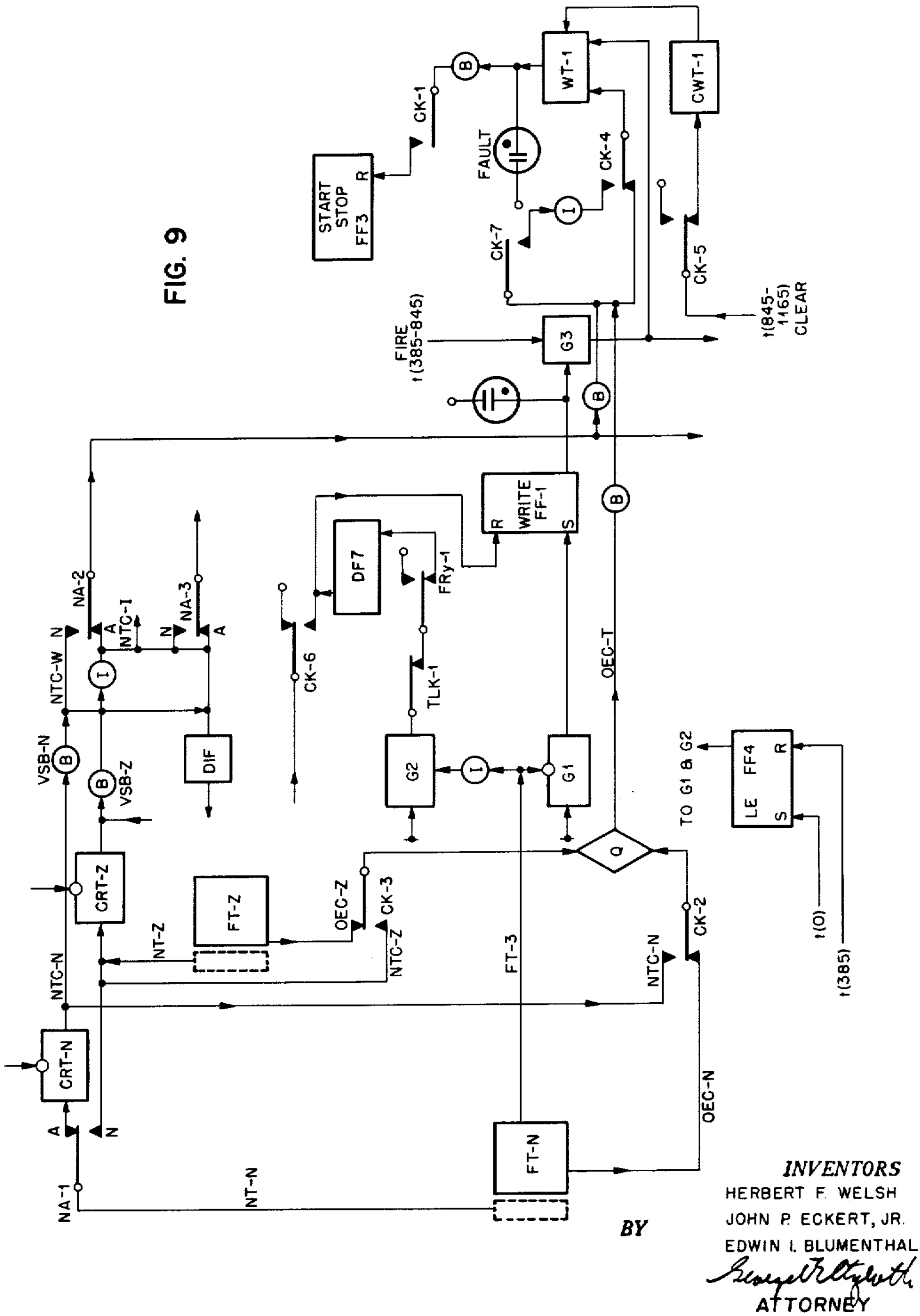
Figure 10:
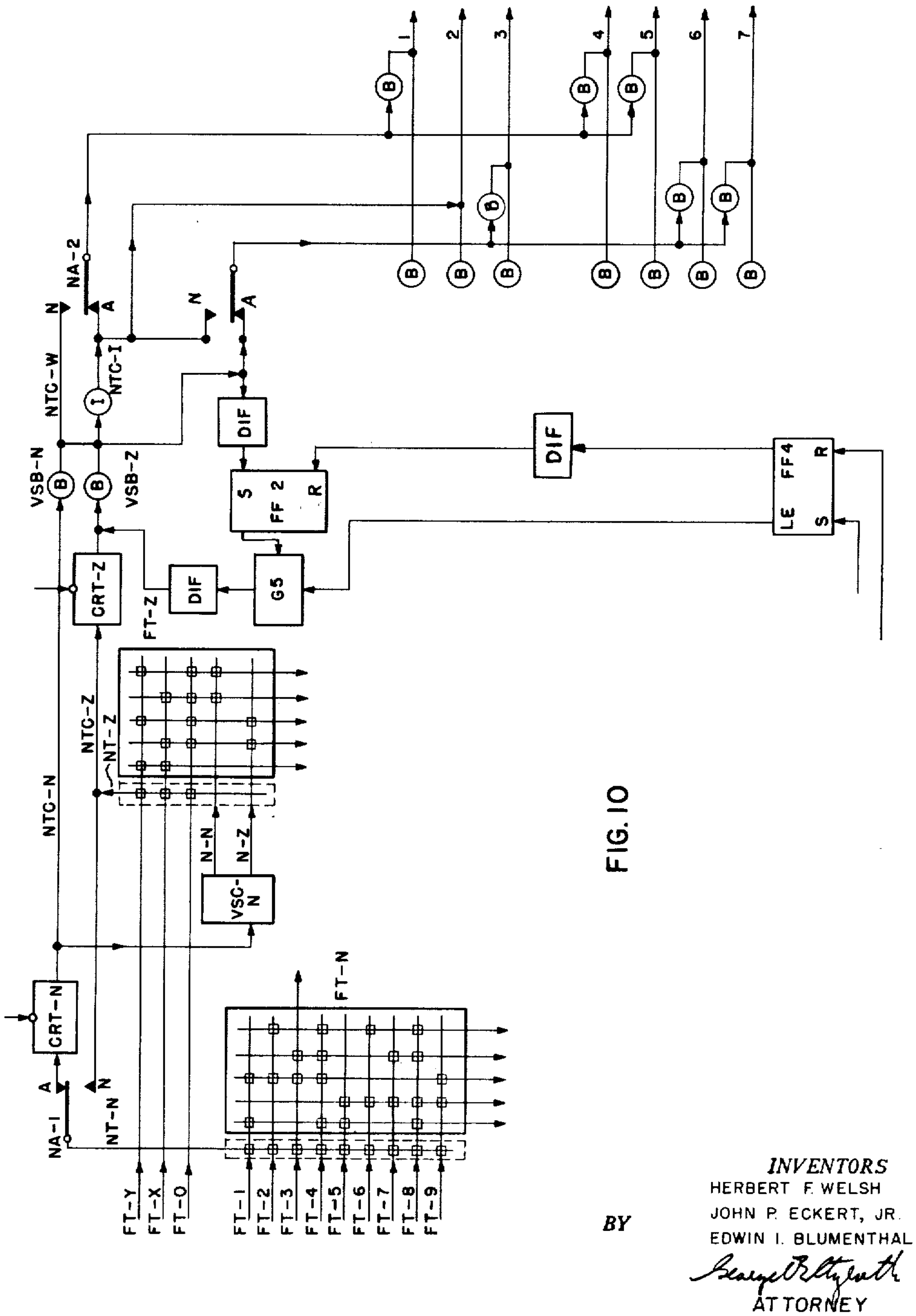
Figure 11A:
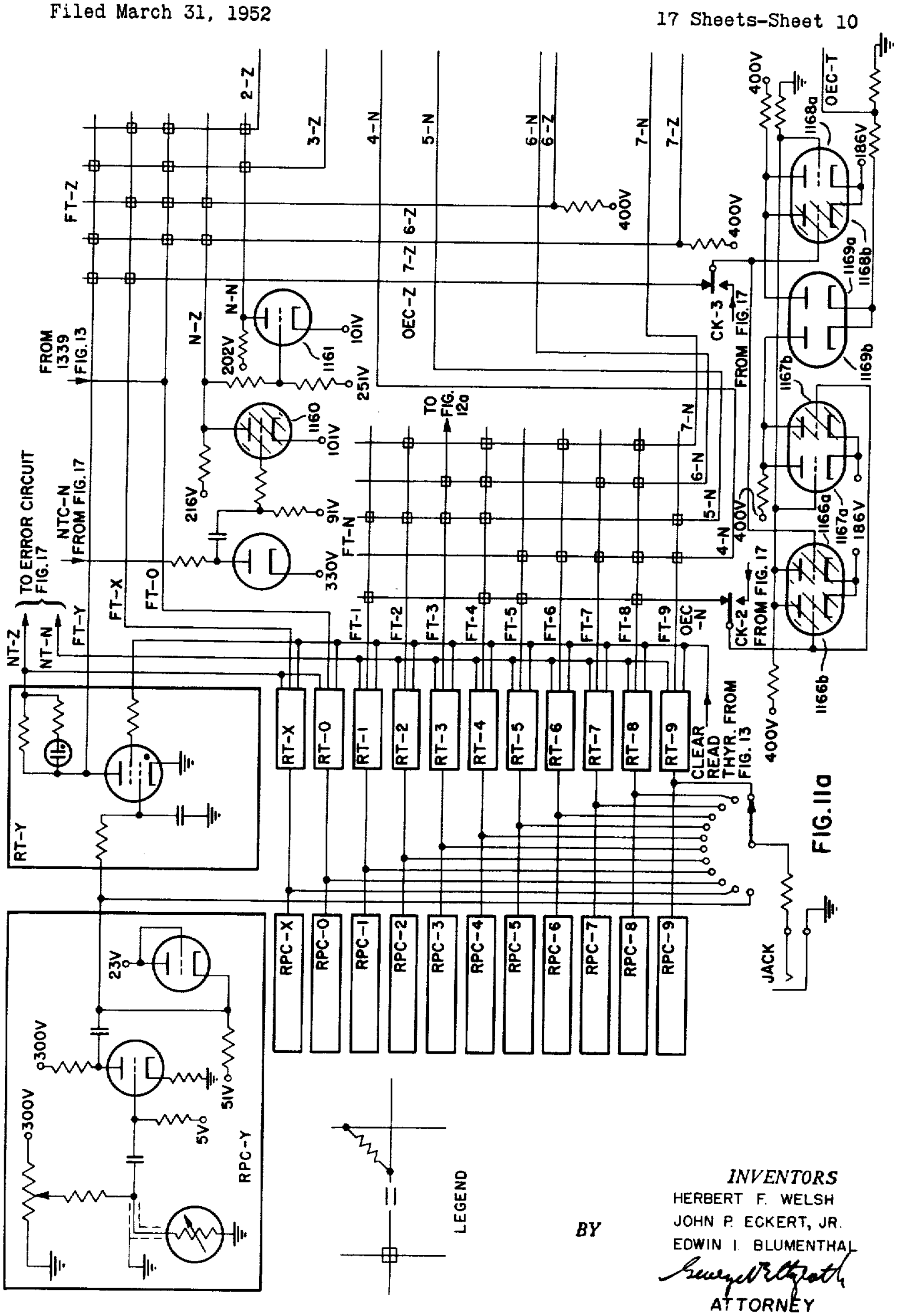
Figure 11B:
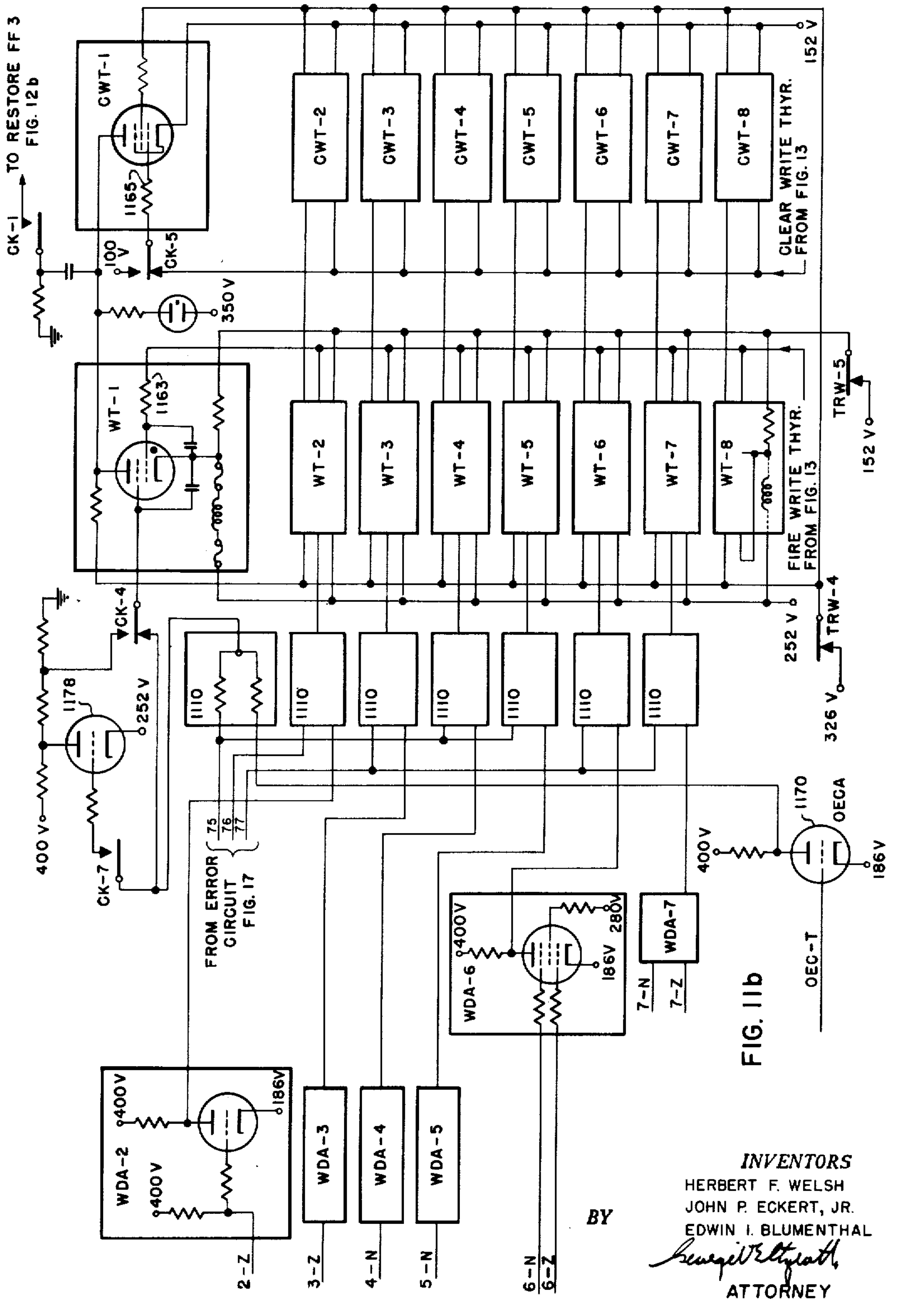
Figure 12A:
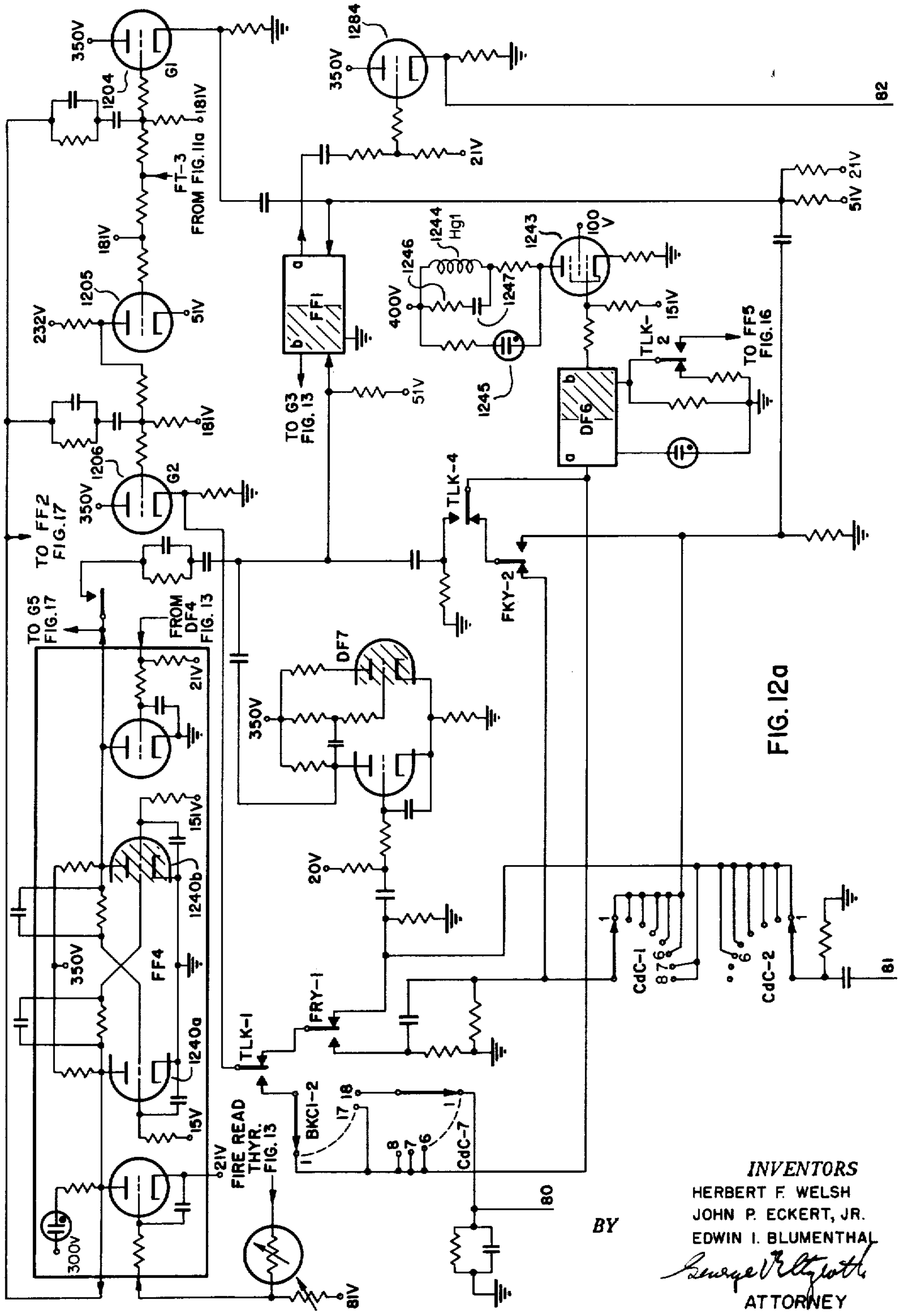
Figure 12B:
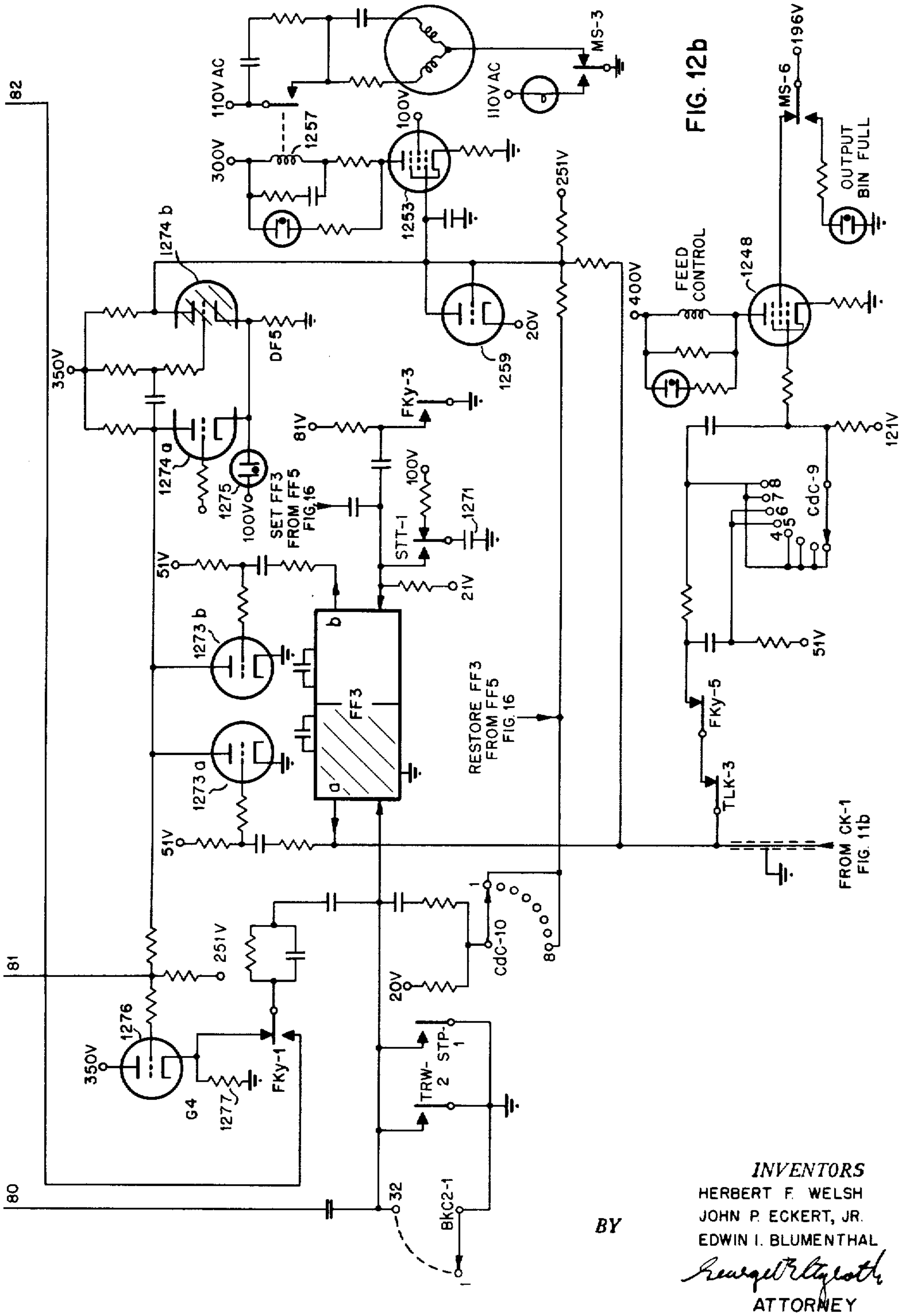
Figure 13:
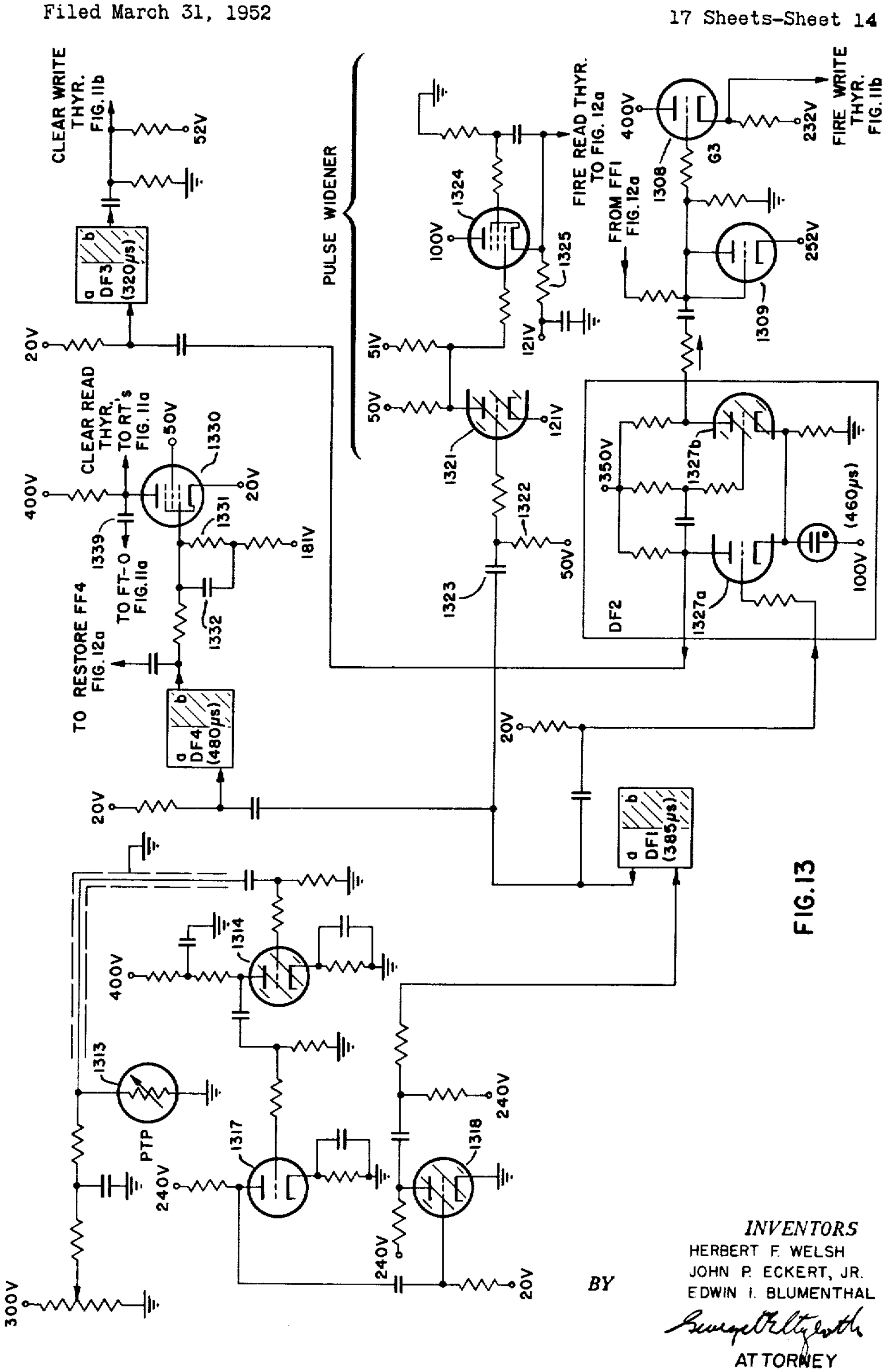
Figures 14A, 14B:
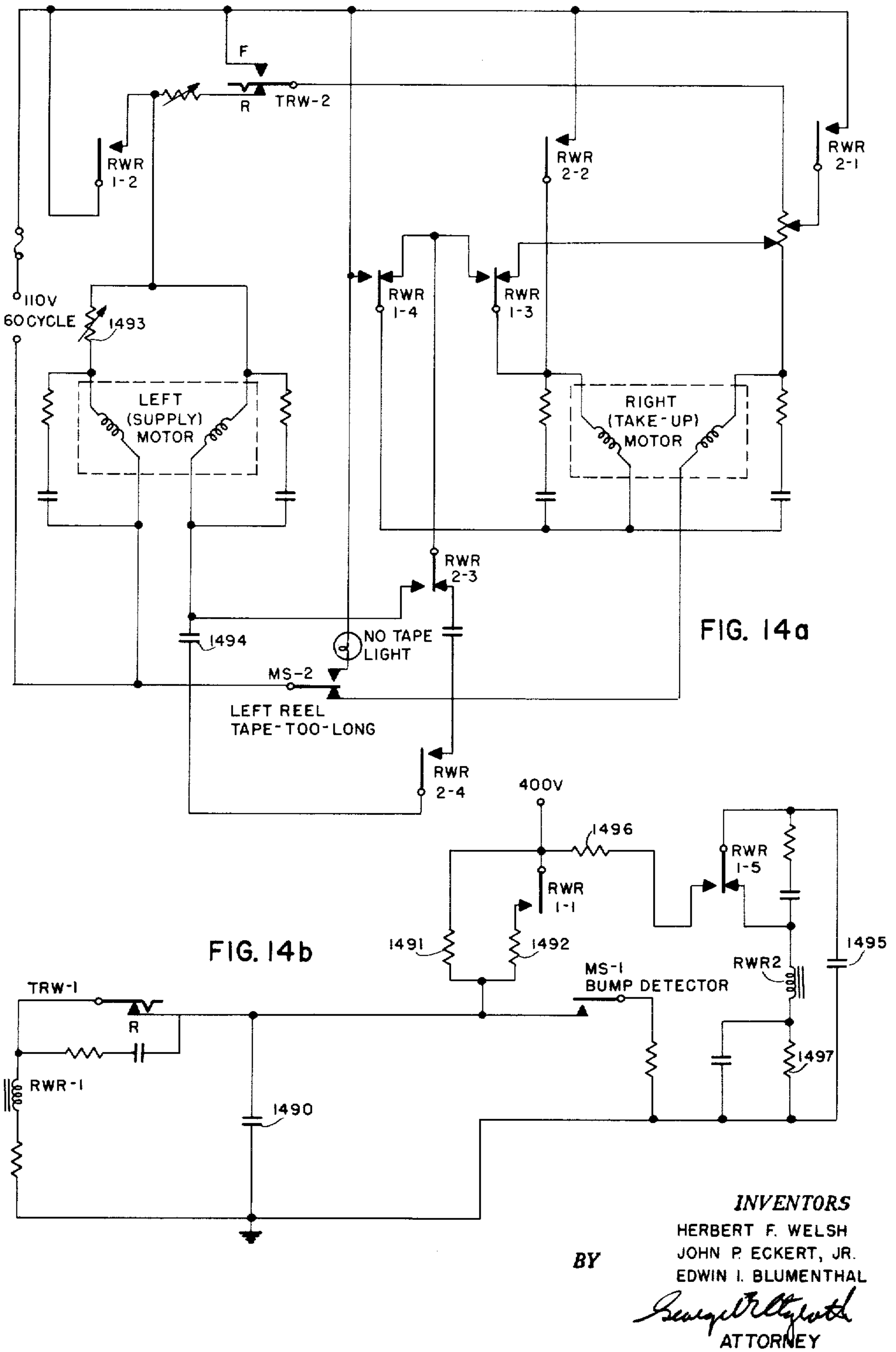
Figures 15, 16:
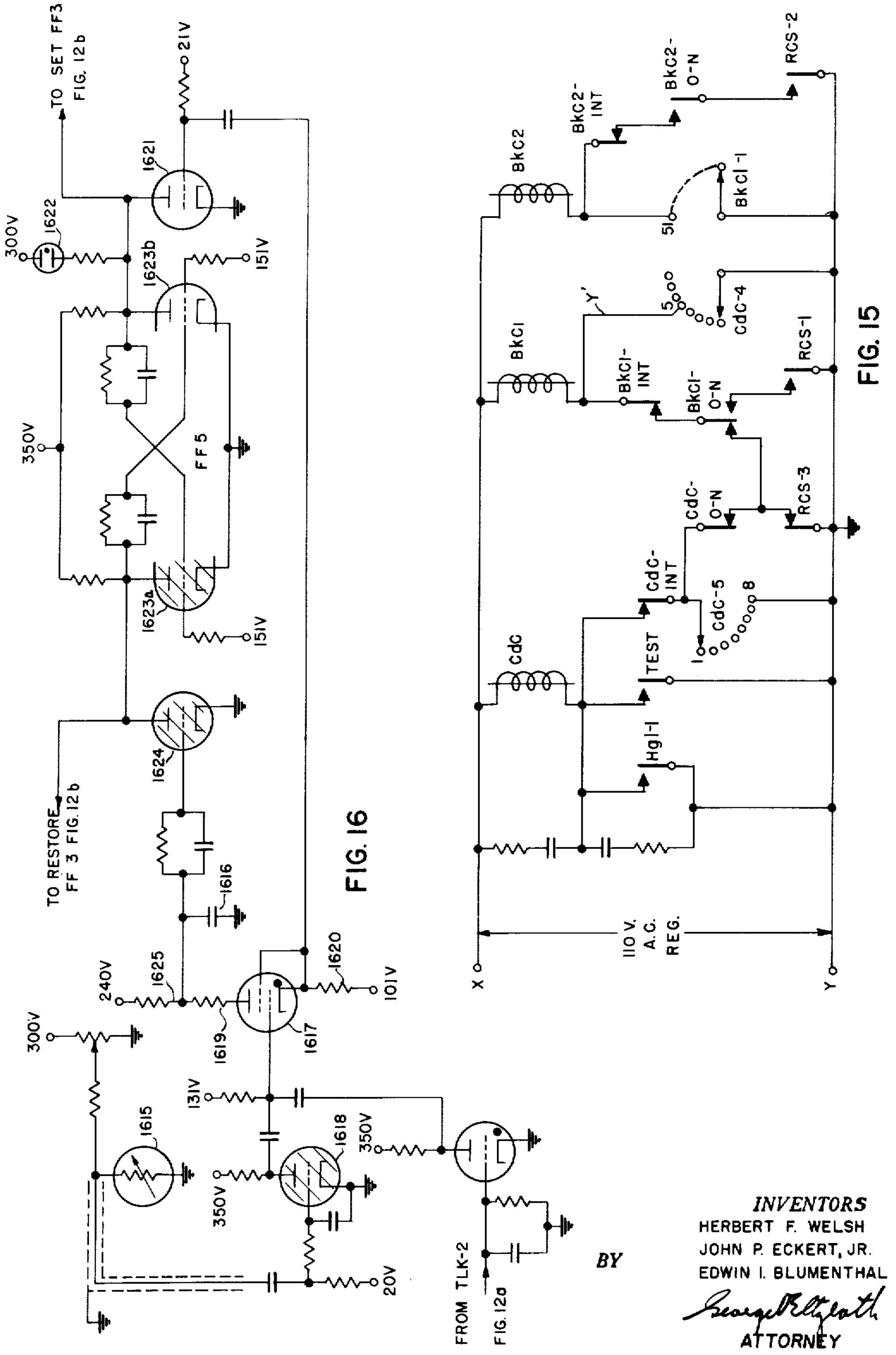
Figure 17:
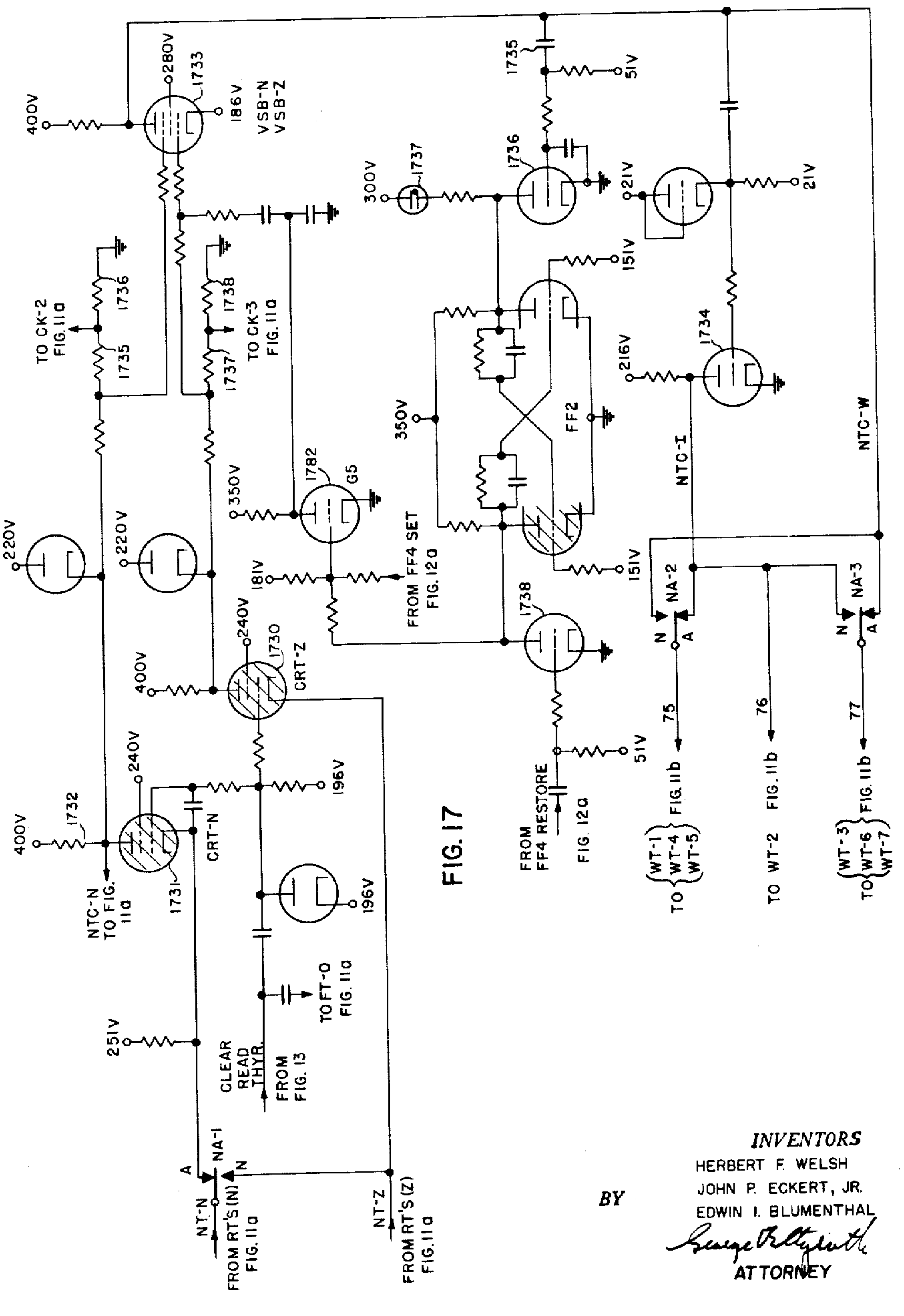

Other objects of the invention will in part be described and in part be obvious as the following specification is read in conjunction with the drawings in which:

FIGURE 1 is an isometric view showing a physical embodiment of the invention,

FIGURE 2 is a perspective view of a magnetic tape and recording head in relative alignment, FIGURE 3 is a simplified block diagram of the invention, FIGURES 4, 5, 6 and 7 together constitute a block diagram illustrating the invention, FIGURE 8 is a block diagram of the function table, FIGURE 9 is a block diagram of the check circuit, FIGURE 10 is a block diagram of the error detection circuit, FIGURES 11*a* and 11*b* together constitute a schematic showing of the information channel including the information photocell and function driver circuits, the function table and the information recording circuits, FIGURES 12*a* and 12*b* together constitute a schematic showing of the card presence detection circuit and the control circuits, FIGURE 13 is a schematic showing of the cycle unit circuit, FIGURES 14*a* and 14*b* together constitute a schematic showing of the tape reel motor circuits, FIGURE 15 is a schematic showing of the circuits for resetting the counting switches, FIGURE 16 is a schematic showing of the bad spot detection circuit, and FIGURE 17 is a schematic showing of the error detection circuits.

For a clearer understanding of the particular circuit arrangement shown in the accompanying drawings and for convenience in describing the circuits in detail, typical values for the potentials of the various power sources have been given. Reference to these potentials is, therefore, intended to indicate appropriate power sources. It will be understood, of course, that the potential values are given by way of illustration only, and that they may be varied depending upon the specific circuit conditions. Positive voltage sources are identified by even numbers of like voltage, negative voltage sources by odd numbers of like voltage. All relay poles are shown in the drawings in a deenergized position while all switch poles are presented in a non-operated position.

It should be understood, however, that the invention is represented in the specific function or functions of any individual circuit and in the basic relationships between the different circuits. It may, therefore, be regarded as obvious that any change in the set-up of the apparatus is unessential as long as such change does not effect such functions or basic relationships.

The particular embodiment of the invention is to read data from eighty column punched cards, interpret this data column by column, translate it into pulse code combinations and make a magnetic record on tape. Although the use of magnetic tape for recording is referred to, the use of different means of recording is equally applicable. For simplicity of description tape will be referred to with the understanding that this term includes any recording device. Magnetic tapes are well adapted for the storage of coded information in the form of minute magnetized spots thereon which, for convenience of terminology, will be referred to as pulses. For example, as indicated hereinafter, a magnetic tape may very well be provided with multiple lengthwise channels carrying pulses selectively arranged so that a particular combination of pulses existing in corresponding positions in the various channels may represent numbers, letters, punctuation, machine instructions, or other information. In a particular example, the pulses are recorded in eight parallel channels on the tape at a density of twenty pulses per inch in each channel. Of the eight channels, six channels carry the coded information, the seventh channel carries a check pulse and the eighth channel carries a sprocket pulse. The binary pulse combination code employed and the equivalent characters, etc., are given in the table below. This table does not include the sprocket pulse which must accompany each pulse combination. The sprocket channel is disposed intermediate among the parallel channels illustrated in FIGURE 2.

*Pulse Code Combination*

| Pulse code | Character | Pulse code | Character |
|---|---|---|---|
| 1 01 0100 | A | 1 00 0011 | 0. |
| 0 01 0101 | B | 0 00 0100 | 1. |
| 0 01 0110 | C | 1 00 0101 | 2. |
| 1 01 0111 | D | 1 00 0110 | 3. |
| 1 01 1000 | E | 0 00 0111 | 4. |
| 0 01 1001 | F | 0 00 1000 | 5. |
| 0 01 1010 | G | 1 00 1001 | 6. |
| 1 01 1011 | H | 1 00 1010 | 7. |
| 0 01 1100 | I | 0 00 1011 | 8. |
| 1 10 0100 | J | 1 00 1100 | 9. |
| 0 10 0101 | K | 1 01 0010 | period (.). |
| 1 10 0110 | L | 1 01 0001 | comma (,). |
| 1 10 0111 | M | 0 01 0011 | semi-colon (;). |
| 1 10 1000 | N | 0 00 0010 | minus (−). |
| 0 10 1001 | O | 0 11 0100 | %. |
| 0 10 1010 | P | 0 10 0011 | slash (/). |
| 1 10 1011 | Q | 1 00 0000 | ignore. |
| 0 10 1100 | R | 0 00 0001 | space. |
| 1 11 0101 | S | 0 10 0000 | tabulation. |
| 1 11 0110 | T | 0 01 0000 | carriage return. |
| 0 11 0111 | U | 0 11 1101 | single character shift. |
| 0 11 1000 | V | 1 10 1101 | shift lock. |
| 1 11 1001 | W | 0 10 1111 | unshift. |
| 1 11 1010 | X | 0 11 0001 | printer breakpoint. |
| 0 11 1011 | Y | 1 11 0000 | printer stop. |
| 1 11 1100 | Z | | |

The information from an eighty column card requires eighty digit spaces on the tape. For convenience, the code characters are arranged in groups of twelve called words. Each card is allotted 120 digit spaces, or ten words. The first eighty tape spaces contain the information from the card; the remaining forty spaces are filled with ignore signals with the exception of the 120th digit, which is reserved to indicate whether or not any errors were detected in the preceding card. Information from the cards is written on the tape in blocks of sixty words. Each block contains the information from six cards. Space between blocks is inserted automatically by inhibiting the feed of two cards after feeding a block of six.

The main components of the invention, which, for convenience, will be referred to in its entirety as the "converter," comprises a main control panel, a secondary control panel, a tape panel, the card feed system and the associated control circuits. The main control panel contains a main On-Off switch, a Start-Stop key, a Reset-Fill-In key, a Take-Up-Rewind key, an Alphabetic-Numeric key, an A.C. On lamp and a D.C. On lamp. On the secondary control panel are a Check key, a Tape Load key and No Tape, Output Bin Full and Final Block indicating lamps. The tape panel carries tape reels and pulleys, a center drive motor and a recording or write head. The card feed system contains a supply bin, an output bin, a precision timing drum, a timing disc, a leading edge photocell, card-read photocells and a drum driving motor. An illustrated, comprehensive description of this system appears on pages 8 to 11 of "Review of Input and Output Equipment Used in Computing Systems," published by the Joint AIEE-IRE-ACM Computer Conference of December 10 to 12, 1952.

The circuits of the converter may be subdivided into seven groups as shown in the simplified block diagram, FIGURE 3. The holes in each card are read by the photocells which alert corresponding function table drivers. These drivers operate the write circuits through the function table and energize the various channels of the write head to make the actual record on the tape. Clocking or timing pulses are emitted by the cycling unit and, through the control circuits, trigger the function table drivers and write circuits at the correct instants in time. Errors in hole combinations are detected in the function table driver circuits by the error circuits which communicate directly to the write circuits.

There are several concurrent sets of cyclic events occurring in the converter. The column cycle, which is the shortest, occurs once per column. The time of occurrence of events in the column cycle is identified by the letter "$t$" followed by the number of microseconds in parentheses. Timing starts at an arbitrary $t(0)$ determined by the precision timing drum, PTD, for each column cycle during the whole time the converter is running. There are 120 of these column cycles in a card cycle. There are eight card cycles to a block cycle. There are about 1700 block cycles in a normal or standard run.

Referring to block diagram, FIGURES 4, 5, 6 and 7, during the column cycle, which is the shortest:

(*a*) One or two of the card-read photocells, RPC, is exposed which, after amplification,
(*b*) Fires the associated read thyratron, RT, which,
(*c*) Excites the corresponding input wires of the function table, FT, thus,
(*d*) Generating a coded combination of signals on
(*e*) The alert wires to the write thyratrons, after which
(*f*) The write thyratrons, WT, fire, and
(*g*) The magnetic pulse code combination is recorded on the tape.

The card cycle is second in length. It consists of the eighty column cycles during which the holes on a card are read and forty column cycles which are normally filled with "ignore" pulse code combination. The block cycle is next in length. Although there are eight card cycles to a block, only the data from six cards are recorded and two card spaces are left blank by suppressing the card feed. These spaces are the spaces between blocks.

Two standard fifty position stepping switches count the blocks in a run. Since there are fifty-two mechanical positions to a revolution, and the second block count switch B*k*C2 receives one pulse per revolution of the first block count switch B*k*C1, each step of the second switch represents fifty-two blocks of cards. When the second block count switch reaches the thirty-second point, the converter stops, and 1664 blocks of cards have been transferred to a tape.

The cards with punched data are stacked at the feed station. On the feed stroke, a card feed knife catches a card, pushes it endwise downward between rubber feed rollers, until the leading edge rests against the card stop on the reading drum. Because the feed rollers push the card through at a speed slightly in excess of the reading drum speed, a bulge develops in the card which holds it firmly against the card stop and assures proper orientation. The adjustable card stop is cam advanced shortly before the card is fed against it. A short distance farther along, the card stop is gradually retarded by a receding cam into the read position and the rotation of the drum draws the card under the line of card-read photocells at the read station.

By means of the timing comb slits in the precision timing drum, the events in the reading unit are synchronized with the progress of the card, as the reading drum draws it through the reading station and past the card-read photocells. The timing drum has 120 axial slits, one per column, arranged circumferentially along one edge of the reading drum. There is a timing disc geared to run three times the drum speed and having one wider, longer exposure, opening, designated as the Leading Edge slit. This LE slit is oriented to expose the LE photocell during the time when the column-120 cycle of the previous card is at the reading station. This position of the following card is referred to as column-0 because it occurs just before the card reaches the column-1 position; the masking effect of this following card is used to indicate the presence of a card.

Normal operation of the converter consists of examining first for the presence of a card. If a card is not present, then the whole translating system is disabled until a card is detected. If a card is present, then each column is read and translated from the punched card code to the seven channel binary pulse code and recorded on magnetic tape. After six cards are fed, the card feed is deactivated for the space of two cards in order to insert the space between blocks. At the end of a run of 1664 blocks or 9,984 cards, a fill-in operation takes place under the control of the operator. The tape feed system starts to pull tape before the card feed begins and continues to draw tape over the recording head until the end of the run.

Each of the twelve rows of perforations, Y, X, 0, 1, . . . 9, on a card has a corresponding card-read photocell, RPC–Y, RPC–X, . . . RPC–9. At the read station the card passes endwise between the bank of card-read photocells and a light source. As each column of the card passes the read station, the RPC's read the perforation combination that is punched in the card. Each RPC that is illuminated through a card perforation sensitizes its associated card-read thyratron, RT.

A triggering pulse $t(0\text{–}50)$ from the cycling unit fires the sensitized card-read thyratrons. Each RT produces a signal on the associated driver line, FT–Y, FT–X, . . . FT–9, of the function table, FT.

The function table consists of two sections, one to translate numerals, FT–N, and the other to translate zones FT–Z.

The sections of the function table, FT–Z and FT–N, translate from the card perforation code to a binary pulse code. Both the card code and the binary pulse code employ zone indicators and numeral indicators. Zone indicators on the card are in the three top rows in the column, called row-Y, row-X, and row-0. Zone indicators in the binary pulse code are the digit positions 2 and 3. Numeral indicators on the card are rows 0 to 9. Numeral indicators in the binary pulse code are the digit positions 4, 5, 6 and 7. A numeral is indicated on the card by a single perforation in the row that represents that numeral. A numeral is indicated in the binary pulse code by a binary pulse combination in channels 4, 5, 6 and 7. The card code uses no zone perforation in recording numerals nor does the binary pulse numeral code have any zone pulse. The binary pulse code zone indicator for numerals, in other words, is – 00 – – – –.

The FT–Z driver lines, which represent the zone indicators Y, X and 0, control the output lines, which set up zone write-driver thyratrons, WT–2 and WT–3, for the zone indicator. The FT–N driver lines, which represent the numerals 0 to 9, control the output lines which set up numerical write thyratrons, WT–4, WT–5, WT–6 and WT–7, for the numeral indicators.

There are nine input lines for FT–N. Each input or driver line is controlled by the associated card-read thyratron, RT–1 to RT–9. There are six output lines from FT–N. Each of four FT–N output lines controls one of the write thyratrons, WT–4, WT–5, WT–6 and WT–7. A fifth FT–N output line is the odd-even check line, OEC–N, which drives one side of the quarter adder. The sixth FT–N output line is the NT–N line which signifies the number of FT–N driver thyratrons which are fired.

There are five input lines to the FT–Z. Three FT–Z input or driver lines are controlled by the card-read thyratrons, RT–Y, RT–X and RT–0 of zone channels Y, X and 0, respectively. Two other input lines indicate, respectively, whether or not an RT in the FT–N section is conducting. One line carries a signal when any FT–N thyratron conducts: this line is called the numeral or N–N line. The other carries a signal when no FT–N thyratron conducts: this line is called the no-numeral or N–Z line. The numeral and no-numeral lines determine how the perforations Y, X, and 0 are to be translated. These perforations are zone indicators when they occur with a numeral perforation. They have a different significance when used alone. The N–N and N–Z lines indicate which meaning is intended.

There are six output lines from the FT–Z. They represent:

| | |
|---|---|
| 2–Z | X or 0, and a numeral. |
| 3–Z | Y or 0, and a numeral. |
| 6–Z | X or 0, and no-numeral. |
| 7–Z | Y or 0, and no-numeral. |
| OEC–Z | X or Y. |
| NT–Z | Number of FT–Z driver thyratrons conducting. |

The 2–Z line and the 3–Z line control write-driver amplifiers WDA–2 and WDA–3, respectively. These lines translate the perforations Y, X, and 0 when these perforations indicate a zone and are inhibited by the N–N line when any RT of FT–N conducts.

| Card Zone | Pulse Code Zone | Write Thyratrons |
|---|---|---|
| X | 10 | WT-2. |
| Y | 01 | WT-3. |
| 0 | 11 | WT-2, WT-3. |

The 6–Z line and 7–Z line control WDA–6 and WDA–7, respectively. These lines translate the perforations Y, X and 0 when these perforations do not indicate zone and are inhibited by the N–Z line when no RT of FT–N conducts.

| Significance | Perforation | Pulse Combination | Write Thyratrons |
|---|---|---|---|
| minus (—) | X | 0 00 0010 | WT-6. |
| space | Y | 0 00 0001 | WT-7. |
| numeral '0' | 0 | 1 00 0011 | WT-1, WT-6, WT-7. |

The odd-even check line from FT–Z, OEC–Z, like the OEC–N line from FT–N, controls WDA–1 through the quarter adder, and the OEC–T line.

The quarter adder combines the two OEC signals. The output signal from the quarter adder, if present, cuts off the write-driver amplifier, WDA–1, which would otherwise record a pulse in the check channel. Since a single pulse in the check channel alone represents an ignore symbol, no holes in a column of a card automatically records an ignore symbol. If the quarter adder receives a signal on either intermediate OEC line, OEC–Z or OEC–N, then the combination to be recorded is already odd and no check pulse is needed. If the quarter adder receives a signal on both lines, then the pulse combination of FT–Z and FT–N are each odd; but their sum combination is even, and therefore a check pulse is not required. The quarter adder does not give an output if it receives a signal on both or neither intermediate OEC lines, OEC–Z and OEC–N.

To determine whether the signals from the card-read photocell and thyratrons should control the write thyratrons, it is necessary to detect whether or not a card is in the read position. The leading edge zone of the card is scanned by one of the card-read photocells. Logically, this scanning the LE zone could be done by any one of the RPC's. The channel 3 photocell, RPC–3, and is associated thyratron, RT–3, have been chosen.

As the LE zone of the card passes the line of card-read photocells, light from the lamp passes through the lens system and strikes the card. The card feed drum is slotted an extra distance on channel 3. If no card is present, the light falls through that slit on the channel 3 photocell, RPC–3.

As a result, the following three chains of operations take place during the column-0 cycle which is identical with the column-120 cycle: (1) The 120th axial slit of the timing comb exposes the precision timing photocell PTP. The pulse from the PTP sets the Function Table Set-up delay flop DF1. (2) The Leading Edge (LE) slit on the timing disc which is coordinated with the 120th axial slit of the timing comb, and with this slit only, exposes the Leading Edge (LE) photocell. This, in turn, sets the Leading Edge flip-flop FF4 (see left side of FIGURE 5). (3) The channel 3 (RPC–3) photocell is either masked by the leading edge of a new card or exposed to the light, if there is no card. In the latter case, the associated Read Thyratron RT–3 fires and inhibits gate G1 and alerts gate G2 which control the restore output from the Leading Edge flip-flop FF4.

When DF1 sets, it sends a pulse $t(0)$ through a pulse widener, which produces a pulse $t(0–50)$. The $t(0–50)$ pulse triggers the card-read thyratrons associated with each card-read photocell if light falls on the corresponding photocell. In this specific case, Read Thyratron RT–3 is triggered, if the channel 3 photocell was not masked by the leading edge of a newly arrived card.

Time must be allowed for the RT to come to full conduction and for the connected input line of the function table to stabilize before any subsequent actions can occur. An interval of 385 microseconds is allowed after the trigger pulse, $t(0)$, for the RT's to set-up. This interval is measured by DF1. As DF1 restores automatically after 385 $\mu$s., it gives a pulse at $t(385)$ which restores FF4. As FF4 restores, it sends a signal to two gates, G1 and G2, which are mutually exclusive under the control of the channel 3 card-read thyratron RT–3. When there is no card, the RT–3 fires and indicates the absence of a card by inhibiting G1 and by alerting G2, so that the signal from FF4, when it restores, passes through G2 to restore the Write flip-flop, FF1, via the delay flop DF7. If the channel 3 thyratron is not fired during the leading edge zone, the presence of a card is indicated and G1 is not inhibited, and the signal from FF4, when it restores, goes to set the Write flip-flop.

The signal which passes through G1 also sets the Card Counter delay flop DF6 via the 1–6 wire of the bank-1 contacts of the card counter *CdC*, and contacts on the Fill-In key, FK*y*–2, and Tape Load key, TLK–4. When set, FF1 sends out a signal which opens G3, to allow the write action to occur at $t(385)$. The delay caused by DF7 is necessary to insure that the record signal from set FF1 holds G3 open until after the fire tape thyratron signal at $t(385)$.

The output of DF6 is amplified in order to step the card counter switch, *CdC*. DF6 restores automatically after 45 ms. and is ready for the next card counting pulse. As the first column of the card passes the line of card-read photocells, the reading light passes through the perforations and falls upon the card-read photocells. At the same time an axial slit of the timing comb passes between the light source and the precision timing photocell, PTP. The pulse from the PTP sets the DF1 which sends the $t(0)$ pulse to the pulse widener to produce the $t(0–50)$ pulse. The $t(0–50)$ pulse triggers the RT associated with each card-read photocell RPC which receives light through a perforation. Coincidence of the $t(0–50)$ pulse and light on any RPC causes the associated RT to fire. The output from each RT is connected to one driver line of the function table.

The DF1 automatically restores after 385 microseconds and gives a pulse to Duty Cycle delay flop, DF2, and to Clear Input delay flop, DF4, and sends a restore pulse to the LE flip-flop, FF4. The restore pulse has no effect on FF4 since it is in restored condition except during the LE zone scanning. The set output of FF1 opens G3 during the LE zone so that a pulse from DF2 may fire the write thyratrons at each $t(385)$ of the entire card cycle. The DF2 restores automatically at the end of 460 microseconds to generate the $t(845)$ signal. The $t(845)$ signal from DF2 also sets delay flop DF3 to clear the write thyratrons. At $t(385)$, DF4 is set by DF1 and automatically restores 480 microseconds later at $t(865)$.

The output of DF4 passes through a pulse widener with a 100 microsecond delay resulting in a signal $t(865–965)$, which clears the input to the FT.

DF3 automatically restores at the end of 320 microseconds at $t(1165)$ during which time it gives an output signal which clears the write thyratrons. The driver lines from the RT's to the function table connect through a resistance matrix to the seven write-driver amplifiers, WDA, so that when the $t(385)$ pulse is passed through gate G3 the particular pulse combination code is set-up on the WT's.

As each succeeding column of the card passes the line of card-read photocells, the column cycle is reinitiated by the next radial slit exposing the PTP. The column cycle repeats for the eighty columns of the punched card during which time the information on each column sets up the RT's. The outputs from RT's pass through the function table which translates the information into the pulse code combination. The outputs from the RT's also trigger the write-thyratrons to make the magnetic recording. During the forty column cycles which follow the last column of the card, the card-read photocells automatically excite the "ignore" pulse code combination at the write magnetic head during this time.

During the column-120 cycle, the LE slit exposes the LE photocell to test for the presence of the next card. During this cycle, inspection is made to determine whether or not there has been any error on the previous card. If there have been any, the signal from the FF4, as it sets, passes through gate G5 to generate the "error" symbol which is substituted for the "ignore" in position-120. This completes the card cycle.

Each exposure of the LE photocell by the LE slit indicates the beginning of a card cycle by setting and restoring the Leading Edge flip-flop, FF4, and by setting card count delay flop, DF6. Each time DF6 restores the card count switch advances one point. The card cycle repeats eight times for each block. The card count switch inhibits card feed during the last two card cycles of the block cycle to generate the space between blocks. Because of the transit time between the feed station and card-read station, the card feed stops during the fifth card cycle of the *CdC* switch and starts again during the seventh or next to last card cycle of the block. As the *CdC* switch advances through each block of card cycles, a similar stepping switch, B*k*C1, is triggered from *CdC* to count the blocks.

During each block cycle the first block count switch B*k*C1 advances one step. As B*k*C1 advances into position-51, it closes the stepping circuit of the second block count switch, B*k*C2. As B*k*C1 advances from position-51 to the next or home position, it opens the circuit to B*k*C2 and advances that switch to the next point. Finally there comes a time when the *CdC* switch advances to position for card-6, which opens the stepping circuit for B*k*C1. Switch B*k*C1 advances from position-51 and thereby opens the stepping circuit of B*k*C2. Switch B*k*C2 advances to position-32. When B*k*C2 advances into this position it closes a circuit which indicates the end of the run by stopping the converter. This action not only includes the card feed which is not feeding at this particular instant but also the magnetic tape which has been running continuously since the start of the run. The Last Block lamp lights to indicate end-of-run.

Information is recorded on the tape by a write head which has eight pole pieces. The write head used is shown in FIGURE 2. A magnetic pulse is recorded on the tape by changing the polarity of the pole piece for the channel in which the pulse is to appear. There is normally a current sufficient to saturate the magnetic tape flowing through each channel coil in the write head. This current is momentarily reversed and saturates the tape in the opposite sense to write a digit "1." The duty cycle of the current in either direction is fifty percent for a string of "1's." The current does not reverse for "0's." Since there is always a current sufficient to saturate the tape in one direction or the other, any previous recording is erased as the new record is made.

Of the eight channels in the write head, six channels carry the coded information. The seventh channel records the odd-even check pulse. A check pulse appears in this channel if there is an even number of pulses in the six code channels, and there is no check pulse if the number of pulses in the six code channels is odd. Thus in the seven channels there must always be an odd number of pulses. A pulse is always recorded in the eighth channel with each recorded pulse combination. This is known as the sprocket channel.

A block diagram of the function table is shown in FIGURE 8. It consists of two sections: the zone indicating or FT–Z and the numerical indicating or FT–N sections. Each of these sections is a resistance type matrix translating function table. The signals enter the FT–N section from the card-read thyratrons of channel-1 to channel-9 as lines FT–1 to FT–9. Output lines 4–N and 5–N from the FT–N section drive the corresponding write thyratrons, WT–4 and WT–5. Output lines 6–N and 7–N from the FT–N section are buffed with output lines 6–Z and 7–Z from the FT–Z section and then drive write thyratrons WT–6 and WT–7. The output OEC–N line from the FT–N section joins the output OEC–Z line from FT–Z in a quarter adder to go through conductor OEC–T and a buffer to the write thyratron WT–1. The remaining output line, NT–N from the FT–N section goes through the voltage sensitive circuit-numerical, VSC–N.

This voltage sensitive circuit is a circuit with threshold between the value when no RT conducts and the value when only one RT conducts. When no RT in the FT–N section conducts, this input potential is above the threshold and the VSC–N excites its N–Z output. When one or more RT's in the FT–N section conduct, the input is below the threshold and the VSC–N excites its N–N output. These two outputs from the VSC enter the FT–Z. In addition to the output from this VSC, the signals which drive the FT–Z section come from the card-read thyratrons, RT–Y, RT–X and RT–0. The interpretation of the drivers FT–Y, FT–X and FT–0 by the FT–Z section of the FT is determined by the difference between these two states of the VSC. Output lines 2–Z and 3–Z from the FT–Z section drive the corresponding write thyratrons, WT–2 and WT–3.

Of the other output lines from FT–Z, the 6–Z and the 7–Z combine with the 6–N and the 7–N from the FT–N section, respectively. The OEC–Z combines with the OEC–N through the quarter adder.

The end of a tape or run is represented by one full block of "fill-in" signals. The "fill-in" sequence is initiated by closing the Fill-In key, FK*y*. During "fill-in" the tape center drive turns, but the card feed is disabled. Special fill-in pulse code combinations are generated by the converter. During the first eighty column cycles of the "fill-in" cycle, the absence of a card at the read station causes more than two card-read thyratrons to fire, which in turn trips the error circuits. During the next thirty-nine columns the mask on the card feed drum prevents the photocells, RPC, from receiving light. As a result, the "ignore" pulse code combination is recorded. Finally the error circuit inserts the "error" pulse code combination during the 120th or last column cycle.

Whenever the last card in the card supply bin has passed through the converter, the card feed and the tape center drive motor stop. If the last card did not complete a block, then "fill-in" signals are recorded to finish out the block when the Fill-In key is held closed. The Fill-In key spring-returns when released. Thereafter, each time the Fill-In key is closed, the converter starts the tape center drive, records one whole block of "fiill-in" signals and stops the tape center drive motor. As many blocks of "fiill-in" as desired can be recorded by repeating the "fiill-in" cycle. Each block of "fiill-in" consists of six cards of eighty columns of "error," thirty-nine columns of "ignores" and one column of "error" followed by two card cycles of blank space between blocks.

When the Fill-In key is closed, the Start-Stop flip-flop FF3 sets and the Fill-In relay, FR*y*, circuit is closed. The Fill-In relay delays operation in order to give the tape time to reach full speed. When the FF3 sets, it sends a signal to start the tape motor and set the start-stop delay flop DF5. Since no card feeds, RT–3 alerts G2 to pass the first LE pulse as FF4 restores. This pulse goes to the restore input of FF1 which is already restored and also goes through 1–6 wire at bank-2 of *CdC* switch. This pulse is stopped at gate G4 which is inhibited by DF5 for 300 milliseconds.

After FR*y* operates, the LE pulse passes through FR*y*–1 to the *CdC* switch bank-1 contacts which routes the first six LE pulses to the 1–6 wire. Through a FK*y*–2 contact these pulses go to the card stepping DF6 and also to set the Write flip-flop FF1. The seventh LE pulse does not advance the *CdC* switch but is rounted through the *CdC* switch bank-1 contacts to the 7–8 wire and thus restores the Write flip-flop. The output of FF1, when it restores, removes the alert from "write fire" G3 and restores the Start-Stop flip-flop, FF3, through a buffer and a contact of the Fill-In key, FK*y*–1. FF3 sets DF5 and the center drive motor continues to run although no cards are in transit.

When the Fill-In key is restored to normal, the LE pulses pass through the normal Fill-In contacts to the restore input of FF1 and through the 7–8 wire and *CdC* switch bank-1 to step the *CdC* switch through card cycles 7 and 8. The *CdC* circuit opens when at bank-1 it again is in contact with the 1–6 wire. This completes the fill-in block cycle.

A take-up and rewind circuit is provided to take-up the tape pulled over the write head by the center drive motor during forward travel of the tape and to rewind the tape after a run has been completed. The rewind speed is higher than the forward speed.

During forward travel of the tape, the writing circuits are connected to the write head. During rewind, the writing circuits are de-energized to prevent erasing current from destroying the record on the tape.

The tape recorder assembly contains reel motors, a center drive motor, and a recording head. The reeling system is a mechanical servo. Each reel mount has a band type self-energizing brake system which releases or applies whenever the associated loop of tape grows or shrinks to preassigned limits. The take-up or right reel motor has power applied to it continuously, but it is held by the brake-bank until required to reel in tape. The supply or left reel motor is not energized. During rewind the brake-bands automatically release because the brake drums rotate in the reverse direction against the spring loaded end of the brake-band. Power is applied to both the left or rewind reel and the right, or, until now, the take-up reel. During rewind the center drive pulley is released from the motor shaft by unscrewing a small knurled locking knob. The tension is maintained on the tape during rewind because the right motor turns the right reel through a gear ratio of 3:1 while the left motor turns the left reel through a direct drive.

After the tape from the left reel has been hooked onto the leader from the right reel, the left or supply reel must be turned in the reverse, counter-clockwise, direction by hand until all of the slack has been removed and the left-hand loop pulley is far enough to the right to close the microswitch, MS2. This microswitch applies power to the take-up or right motor. The right loop positions a pulley associated with the brake on the right or take-up motor. As this loop increases in size, the brake releases to allow the right motor to take more tape and as the motor shortens the loop the brake is applied gradually to slow down the motor and finally stop the right or take-up motor before the loop becomes too small.

Normally, a run terminates when the stepping switches have counted off a specified number of blocks of cards. The fill-in is a manual operation and may be repeated at the will of the operator. At the end of the tape, rubber bumps are fastened which indicate the end of the reel. The tape passes between a pulley and a post which are far enough apart to clear the tape, but are too close together to allow the rubber bumps to pass through. This stops the tape supply and the left-hand loop shortens until a microswitch, MS3, operates which stops the tape center drive motor.

Before the Rewind key, RW, is thrown, the Start-Stop key must be in the Stop position. If there is a bad spot in the tape, the bad spot circuit would feed cards as it restores and generates a pulse to set the Start-Stop flip-flop, FF3. However, with the Start-Stop key in Stop position such set action cannot occur.

When the Rewind key is thrown to rewind position, the erasing currents are removed from the write head. A charged capacitor is discharged into a first relay, RWR1, which picks up and is held by the current provided by a shunt resistor across the capacitor charging resistor. When relay RWR1 operates, it applies reduced power to the supply or left motor in such a direction as to rewind the tape. Relay RWR1 reverses direction of rotation of and applies reduced power to the take-up or right motor. During this time a second capacitor is charged and when the beginning of the tape is reached, a microswitch, MS1, operates. When MS1 operates, it short circuits the holding coil of relay RWR1 and de-energizes it. The connections on the take-up or right motor are now restored to normal and power is removed from the supply or left motor which has been rewinding the tape. As the relay RWR1 returns to normal, the shunt resistor across the charging resistor for the first capacitor is removed and the charge on the second capacitor is applied to operate a second relay, RWR2. When relay RWR2 operates, it applies a large reversing current to the take-up or right motor and connects additional capacity into the right or take-up motor circuit. However, relay RWR2 does not receive sufficient current in series with the charging resistor to continue holding, so that it releases automatically in a couple of seconds. The take-up or right reel is thus stopped very quickly.

The Tape Load circuit measures off a standard length of tape leader at the start of each new reel of tape.

When the Tape Load key, TLK, is operated, a start pulse sets FF3. Opening of the contact TLK–3 prevents the feeding of any cards. The exposure of RPC–3, indicating no card at the read station, inhibits G1 and opens G2. The output pulse from FF4 as it restores sets DF6 after passing through G2, TLK–1, and B*k*C1–2. The first of these LE pulses also passes through TLK–4 to restore FF1 and prevent any recording. As DF6 restores, a pulse passes through the DIF and contact TLK–2 to trigger the bad spot detecting circuit. The start pulse to set FF3 comes from this circuit as described hereinbefore. The set output from Start-Stop flip-flop, FF3, starts the tape feed motor to draw eighteen blocks of tape past the write head. The Tape Load key, TLK–1, also transfers the LE pulses from the restore input of FF1 to bank-2 of the first block counter switch B*k*C1. From position-1 to position-17 of B*k*C1, these LE pulses are routed directly to the Card Feed delay flop DF6. Finally, when B*k*C1 reaches position-18 the LE pulse is routed, through bank 7 of the C*d*C switch in position-6 to -8, to the DF6. As the C*d*C switch reaches position-1, a further change routes the pulses to restore the Start-Stop flip-flop, FF3, and thereby stops the tape drive motor.

When the Tape Load key is restored to normal the first LE pulse is routed to the Card Feed delay flop, DF6, through normally closed contacts TLK–1 and FR*y*–1, with a slight delay of 400 μs., through DF7 and late-opening, normally open contact TLK–4 of the Tape Load key. Subsequent LE pulses are routed to DF6 through the FR*y*–1 contact to position-7 and -8 of bank–1 of the C*d*C switch and finally FK*y*–2 and TLK–4 contacts.

The count switch reset circuits are employed to orient the counting switches B*k*C1 and B*k*C2 so that the various cycles have the correct lengths. When the Reset Count switch, RCS, key is closed, each of the B*k*C switches goes to home or position-0. When the RCS key is restored to normal the B*k*C1 switch steps ahead into position-1. The orientation of the C*d*C switch at the beginning of a run is automatically provided for by the Tape Load circuits.

When the operator moves the Start-Stop key into START position, the Start-Stop flip-flop, FF3, is set. Whenever FF3 changes, it always sets Start-Stop delay flop, DF5, which automatically restores after 300 ms. While set, DF5 inhibits the gate G4; otherwise, the two card cycles, before the first card reaches the reading station would indicate a misfeed and stop the converter. The set output of FF3 applies power to the tape center drive and also applies power to the card feed actuator through the normally closed contacts of the Tape Load and Fill-In keys, TLK–3 and FK*y*–5.

The operator may stop the converter at any time. This includes both the card-feed and the tape drive. When restarted, the converter continues exactly as if no interruption had occurred. Certain maladjustments and faults can be checked for and located by the Check key and a set of cards having no numerical or prohibited punchings. The converter stops as soon as such a fault is located.

Certain portions of the tape are marked during manufacture as being unreliable for recording purposes. Such bad spots are marked by holes punched in the tape. Recording is held up during the bad spots. Card-feed is halted for a preassigned time to insure passage of the bad spot beyond the write head after which normal control is restored. Whenever a prohibited punched combination occurs on a card a special "error" symbol distinguishable from an information item is recorded on the tape. At the same time that the error symbol is substituted for the erroneous symbol, a notation is made which is inspected at the end of the card. If this inspection shows that an error did occur on the card, the final pulse code combination is not an "ignore" but the same "error" symbol is repeated.

If the number of cards in the output bin exceeds a certain limit, the converter is stopped. If the Supply Bin runs out of cards, the converter is stopped. The positions of the card and block counters are preserved under either of these conditions. After cards are either removed from the output bin or added to the supply bin, according to whichever condition caused the interruption, the converter can then restart from the point of interruption.

Whenever the operator wishes to stop the converter without awaiting the end of a run, the Start-Stop key is moved to Stop position where it locks. This restores the Start-Stop flip-flop, FF3, which cuts off the card feed immediately. As FF3 restores, it sets the delay flop DF5 so that the center drive motor continues to run long enough to record the cards still in transit. The tape center drive then stops.

The checking circuit, shown in block diagram, FIGURE 9, makes use of a special set of cards having either no holes or exactly two holes per column. Operation of the Check key, CK, prevents the regular error circuit from recording the error symbol, but causes the converter to stop and an indicating lamp identifies the reason for the stop.

The Check key, when in Check position, transfers the signals from the FT–N and FT–Z, respectively, to the OEC quarter adder so that a signal from one and only one FT indicates a fault and stops the converter. The CK, via CK–1, also routes the normal error signal to the same stopping circuit. Then, as long as a permissible two-hole combination is correctly read, the converter continues to run. However, when either more than two holes, a prohibited two-hole combination or a single hole per column is read, the circuits are so changed by the closed Check key as to route a pulse to stop the converter by restoring FF3; and an indicating lamp identifies the reason for the stop.

The checking procedure consists of loading these special cards in the Supply bin, closing the Check key, setting the N–A switch to position-A, for alphabetic information, and finally pulling the Start-Stop key into the Start position. Since the OEC pulse in the modified circuits only exists at the time of a fault, improper pulse code combinations would be recorded; hence, there is no need of loading a tape during the check procedure. The converter continues to run as long as the cards feed and no faults develop.

During card cycles 7 and 8, the signal FT–3 opens G2 as it closes G1. Then the pulse, as FF4 restores at *t*(385), would normally be delayed too long to prevent the permissible nonfeed of a card from stopping the converter. The absence of a card, by allowing the card-read thyratron RT–3 to fire, acts through the quarter adder to produce a pulse on OEC–T and thereby to effect the stop. The FF4 set pulse, however, restores the Write flip-flop, FF1, immediately by passing through check contact CK–6 directly to the restore input of FF1.

When the LEP sets FF4 at *t*(0) of column-0, the set output pulse restores FF1 through the CK–6 contact giving the No Write condition. At the following *t*(385), the restore output pulse of FF4 either goes to restore FF1 again through G2, contacts TLK–1, FRy–1 and DF7, if there is no card at the read station, or goes to set FF1 through G1, if there is a card at the read station. Thus the No Record setting is prepared by each LE pulse at *t*(0), and the Write condition is then set at *t*(385) if there is a card at the read station. The outputs NTC–N and NTC–Z from the two FT sections are compared to note any difference between these signals. A difference signifies one type of fault. To detect this difference, one input to the quarter adder is transferred at the check contacts CK–2 from the standard OEC–N and its function table connections to pickup the NTC–N signal. The other input to the quarter adder is transferred at CK–3 from the OEC–Z to pickup the NTC–Z signal. So long as a signal occurs on both of these inputs or on neither of these inputs, the quarter adder does not give an output pulse. However, whenever a signal appears on one only of these quarter adder inputs, there is an output pulse buffed onto the OEC–T line.

A pulse from the normal error detection circuit signifies another type of fault. When it operates, the detection circuit buffs a signal onto the OEC–T line. This signal sensitizes the write thyratron WT–1 to fire at *t*(385–845) through contact CK–7, an inverter, and contact CK–4. To prevent the clear pulse from clearing WT–1 at *t*(845–1165), contact CK–5 opens this clear circuit. A neon lamp indicates a fault and the converter is stopped by routing the signal from the WT–1 thyratron to the Start-Stop flip-flop, FF3.

Whenever a pulse appears on the OEC–T line during the check procedure, it indicates a checking error which should stop the converter. Such an error pulse restores FF3, by passing through CK–7, an inverter, and CK–4 to sensitize the write thyratron WT–1. The output from WT–1 goes to the write head, causes the Fault indicating lamp to glow and stops the converter by restoring the FF3 through a buffer and check contacts CK–1. The clearing of WT–1 by clear tube, CWT, at *t*(845–1165) is prevented by opened contact CK–5. Thus in the event of only one card read thyratron RT conducting in the entire FT or more than one RT conducting simultaneously in either section of the FT, the fault circuit emits a pulse which stops the converter and gives an indication to that effect.

A bad spot detecting circuit is provided for those areas of the tape on which reliable records cannot be made. During manufacture these areas are marked by two punched holes. When the detecting circuits note the first of these holes the Start-Stop flip-flop, FF3, is set, but the Bad Spot flip-flop, FF5, holds the tape center drive in running condition. The FF5 measures an interval of about 3 seconds, during which time tape passes the head. At the end of this interval, FF3 restores, and the circuits return to normal. The time interval is measured by the charging time of a capacitor. A negative enough potential across the capacitor maintains the Bad Spot flip-flop, FF5, in set condition for the required 3 seconds of time. When a bad spot is longer than this minimum length, a subsequent hole causes a redischarge of the capacitor before the potential across it rises sufficiently to restore FF5. The Bad Spot hole is observed by a photocell in advance of the write head. If the Bad Spot hole occurs during the card-5, -6 or -7 cycle the Start-Stop flip-flop FF3, is not allowed to set until the card-1 cycle starts.

A signal on the card-read thyratrons produces a signal on the write thyratrons through either of two channels: one is the normal information channel, and the other is the error channel. The error system, shown in block diagram, FIGURE 10, checks the card-read thyratrons of the function table sections for prohibited punch combinations. Whenever an error exists, the error system substitutes an "error" pulse combination symbol on the tape and, at the same time, suppresses the erroneous signals from the card-read thyratrons.

The punch card numeral code has one perforation per column. Therefore, in position-N of the NA switch, not more than one card-read thyratron should fire. If more than one fires, the error system trips. The card alphabetic code has two perforations per column, one must be a zone perforation and the other a numeral perforation. In position-A of the NA switch, not more than one RT in each group should fire. If more than one RT in either group fires, the error system trips. To detect conduction in more than one RT of either section of the function table, the NT–N wire passes through a pole of the NA switch. In position A of the NA switch, since both zone and numerical indicators occur, the NT–N and the NT–Z lines go to individual voltage sensitive buffers, VSB–N and VSB–Z. Neither buffer passes a signal when the signal from the function table indicates that less than two RT's are conducting, but either buffer does pass a signal when more than one associated RT conducts. Since only one perforation is permitted, the NT–N and NT–Z wires are connected together into the same VSB, VSB–Z, in the position-N of the NA switch.

The combined output of VSB–N and VSB–Z lines, NTC–W, passes through the NA switch to generate the error symbol at the write thyratrons or through an inverter, becoming NTC–I and another contact of the NA switch to inhibit all WT's not used in the error symbol. Write thyratron WT–2 is not used in either error pulse combination. The inhibit signal NTC–I from the inverter, therefore, goes directly to WT–2, without passing through the NA switch contact.

The pulse combination denoting an error in alphabetical data is the same as that for the semicolon: 0 01 0011. In position-A of the NA switch, the signal from the VSB's goes to write thyratrons WT–3, WT–6, and WT–7. The pulse combination denoting an error in numerical data is the same as that for 9: 1 00 1100. In position N of the NA switch, the signal from the VSB's goes to write thyratrons WT–1, WT–4 and WT–5. The output of the VSB's also sets the Error flip-flop, FF2. If an additional error occurs on the same card, the error symbol is written in the corresponding column but the subsequent pulse has no effect on FF2, which is already set. In set condition, FF2 opens error gate, G5.

During the column-120 cycle of a card, while the LE slit exposes the LE photocell, the 120th axial slit exposes the precision timing photocell at *t*(0). The *t*(0) pulse from the PTP sets the Leading Edge flip-flop, FF4. The FF4 passes a signal to Error gate, G5. If G5 is held open by FF2 due to an error notation, the signal passes through G5 and trips VSB–Z to generate the error symbol for the write thyratron. Subsequently the *t*(385) pulse restores FF4, which remains restored until the next LE signal. A pulse from the restore output of FF4 restores FF2 preparing it to receive and remember any future error notation.

When there are no more cards in the supply bin, the card presence circuits function and stop the converter. When the first car fails to feed, the channel-3 card-read thyratron, RT–3, fires and opens G2 as it inhibits G1. The restore pulse from FF4 then passes through G2 to restore FF1 and through bank-2 of the *CdC* switch to G4. Since gate G4 is normally open, this pulse passes through and restores FF3. The delay flop, DF5, sets and holds power on the center drive motor for 300 ms.

A full-output-bin, indicating circuit has been provided in order to stop the converter when the output card bin becomes full. As the finished cards are stacked in the output bin, their weight gradually loads and stretches a spring holding the receiving tray. As this spring stretches, it lowers the receiving tray so that the top of the stack remains at approximately the same level. When the receiving tray reaches the limit of its travel, it closes switch MS–6 which stops the card-feed and lights the Output Bin Full lamp. The subsequent non-feed of a card stops the tape center drive after the usual delay from the DF5.

A circuit stops the tape center drive and indicates, by lighting a lamp, that the end of the tape has been reached. Rubber bumps, fastened to the tape end, indicate the end of the reel. The tape passes between a pulley and a post which are far enough apart to clear the tape, but are too close together to allow the rubber bumps to pass through. This stops the tape supply while the tape center drive motor continues to draw tape across the read-write head. The left-hand tape loop shortens until a microswitch, MS3, operates. This microswitch opens the tape center drive motor power and energizes the No Tape lamp. No attempt is made to stop the feeding of cards, since the run must be repeated.

The normal operations are hereafter described in detail for each of the following:

(1) The card presence detection circuit
(2) The cycling unit
(3) The control circuits
(4) The information channel
(5) The fill-in operation including special "fill-in" symbols as desired
(6) The take-up and rewind circuits
(7) The tape load operation and
(8) The counter switch reset circuits Reference will now be made to FIGURES 12*a* and 12*b* which show the card presence detection circuit and the control circuits. Before the first card reaches the read station, and during the leading edge zone, light falling upon the channel-3 card-read photocell, RPC–3, results in sensitizing the associated read thyratron RT–3 shown in FIGURE 11*a*. The cycling unit shown in and described in connection with FIGURE 13 delivers a pulse from "fire read thyratron" at *t*(0). This pulse passes through the LE photocell 1202 to set the LE flip-flop, FF4.

Referring to FIGURE 11*a*, the exposure of card-read photocell RPC–3 causes channel-3 read thyratron to fire at *t*(0). The negative-going signal, FT–3, on the anode of RT–3 both decreases the bias on tube 1204 of G1 sufficiently to inhibit passage of the positive pulse from the restore output of FF4, and through the inverting action of tube 1205 increases the bias on tube 1206 of G2 sufficiently to pass the positive pulse from the restore output of FF4, as shown in FIGURE 12*a*. The set output signal of FF4 is not significant at this time.

The cycling unit generates a pulse at DF4, *t*(385), which restores LE flip-flop FF4. The positive pulse from the restore output of FF4, while it is inhibited at G1, goes through G2 to restore Write flip-flop, FF1, after passing through Tape Load key contact TLK–1, Fill-In relay contact FR*y*–1 and a 400 microsecond delay in DF7. Thus the set output of FF1 is removed from G3, shown in FIGURE 13, to inhibit the signal which fires the write thyratron. This is the Non-Write condition in which G1 is closed and G2 is open.

When there is a card at the read station, the alternate condition exists: RPC–3 is not exposed, RT–3 does not fire at *t*(0), G1 is open (grid potential of tube 1204 is only slightly below cutoff), and G2 is closed (grid potential of tube 1206 is sufficiently negative to inhibit). When FF4 restores at *t*(385), the positive pulse from the restore output, passes through G1 to set DF6 via Card Counter switch *CdC*–1, Fill-In key contacts FK*y*–2 and Tape Load key contacts TLK–4. The positive pulse from the restore output of FF4 also sets the Write flip-flop FF1. This is the Write condition. When the Write flip-flop FF1 is set, the potential on the set output raises the bias of tube 1308 and thereby opens the gate G3, as shown in FIGURE 13. Tube 1309 serves as an upper clamp at +252 v. on this signal. G3, when open, is ready to pass the "write thyratron fire" pulse from DF2 at *t*(385).

Delay flop DF6 remains set for 45 milliseconds. While DF6 is set, the positive signal from the anode of section *b* of DF6 is D.C. coupled to cause tube 1243 to conduct and draw its anode current through the operating coil of H*g* relay 1244. Across relay 1244 are connected a neon indicating lamp 1245, which glows while tube 1243 is conducting, and a protective network consisting of resistor 1246 and capacitor 1247. When tube 1243 conducts, the relay 1244 is picked up. Its contacts, shown in FIGURE 15, apply 110 v. A.C. from the supply lines Y and X to the actuating coil of the *CdC* stepping switch. As DF6 restores, the stepping switch *CdC* advances its wipers to the next contact at position-2, because the negative potential from the normally conducting section *b* of DF6 cuts off tube 1243 and thereby de-energizes the H*g* relay 1244. This completes the normal card count cycle for card-1.

This card cycle is repeated for each card. The FF4 restore pulse advances the stepping switch *CdC* one notch or position for each card cycle. During the passage of card-5 only, the stepping switch *CdC* at bank-4, as shown in FIGURE 15, energizes the actuating coil of the first Block Count stepping switch, B*k*C1, by connecting wire Y′ to wire Y of the supply line. This circuit is opened as the *CdC* switch advances its wipers to position-6 for card-6. Then B*k*C1 advances its wipers to the next position. During card-5 and -6, stepping switch *CdC* at bank-9 de-energizes the card feed actuator by reducing the bias on the grid of tube 1248.

During card-7 and -8, a circuit which indicates "no card at the read station" routes the restore output from the FF4 to the DF6. Since there is no card at the read station, the channel-3 card-read photocell is exposed during the LE zone. The associated function table signal FT–3 inhibits or closes G1 by excessively low bias and opens G2 by raising the bias of tube 1206 nearly to cutoff. When the positive pulse, which is generated as the FF4 restores, reaches the grid of G1 tube 1204, it has no effect, but when it reaches the grid of G2 tube 1206, this tube conducts momentarily. The output pulse from G2 appears on the cathode of tube 1206. This output pulse triggers both the DF6 and DF7. DF6 is triggered through position-7 of the bank-1 of the *CdC* switch. Fill-In contacts FK*y*–2 and Tape Load contacts TLK–4. DF7 is triggered via the Tape Load key contacts TLK–1 and Fill-In key contacts FK*y*–1. DF7 restores after four hundred microseconds to restore FF1.

Mechanically, position-8 and -9 of the *CdC* stepping switch are logically equivalent. As shown in FIGURE 15, as soon as the wiper reaches position-8, power from 110 v. A.C.–Y is supplied to the *CdC* actuating coil through contact-8 of bank-5 and the normally closed interrupter contacts of the *CdC* switch. The *CdC* switch is a standard 25 position stepping switch, from which the electrical effect of mechanical position-8 is removed so that only 24 of the 25 mechanical positions are significant. Since there are eight card cycles required per block cycle, three block cycles are completed per card count switch cycle.

The relation between the card cycle number and the mechanical positions of the *CdC* is as follows:

| | | | | |
|---|---|---|---|---|
| Card-1 cycle | Positions | 1 | 10 | 18 |
| Card-2 cycle | Positions | 2 | 11 | 19 |
| Card-3 cycle | Positions | 3 | 12 | 20 |
| Card-4 cycle | Positions | 4 | 13 | 21 |
| Card-5 cycle | Positions | 5 | 14 | 22 |
| Card-6 cycle | Positions | 6 | 15 | 23 |
| Card-7 cycle | Positions | 7 | 16 | 24 |
| Card-8 cycle | Positions 8 | 9 | 17 | 25 |

As the *CdC* switch advances its wipers from mechanical position-25 to home or position-0, power from 110 v. A.C.–Y is supplied to the *CdC* actuating coil through the normally closed contacts of Reset key RCS–3, normally closed Off-Normal *CdC* contacts, the normally closed *CdC* interrupter contacts, through the *CdC* switch actuator coil and completes the circuit at 110 v. A.C.–X. Therefore, as the wipers reach position-0, they are advanced automatically to position-1.

The B*k*C1 switch is a standard 50-position stepping switch and as such has 52 mechanical steps or positions per mechanical cycle. As the B*k*C1 switch comes into position-51, it closes a circuit from 110 v. A.C.–Y, through bank-1 in position-51 of the B*k*C1, the actuating coil of the block count two, B*k*C2, switch and completes the circuit at 110 v. A.C.–X. This circuit operates the actuating coil of the B*k*C2 switch. As block switch one advances its wipers from position-51 to home or position-0, the actuator circuit of block count two opens and the B*k*C2 actuator releases and advances its wipers to the next position. The *CdC* and B*k*C1 switch cycles repeat until finally at the end of the run the converter stops when the B*k*C2 switch moves into position-32.

As the *CdC* switch moves into position-6, it opens the circuit which advances the B*k*C1 switch into position-0, and it, in turn, opens the circuit which advances the B*k*C2 switch into position-32. This action causes switch B*k*C2 at bank-1 to place a ground on the terminal connected to —21 v. through resistor 1249, and to the grid of the restore trigger tube of Start-Stop flip-flop, FF3. Switch B*k*C2 at bank-2 closes the circuit to cause the Last Block neon indicating lamp 1252 to glow.

Connecting the grid of the restore trigger tube of FF3 to ground potential causes the tube to conduct and produces a negative pulse on its anode. This pulse restores FF3 and simultaneously sets DF5. In the restored condition, FF3 drives the grid of tape drive motor relay driver tube 1253 negative, provided DF5 is not set. However, delay flop DF5, which has just been set, holds the bias for tube 1253 above cutoff and the tape continues to run for an additional 300 milliseconds to record the cards that are still in transit. At the end of the 300 millisecond interval, DF5 restores, removes the overriding voltage, cuts off tube 1253, and stops the tape center drive motor.

The card feed is already disabled because the grid of feed control relay driver tube 1248 is disconnected from the anode of FF3 section *a* at bank-9 of the *CdC* switch when the ground is applied to the grid of FF3 restore trigger tube by the B*k*C2. This marks the completion of a run.

FIGURE 13 shows the cycle unit. The column cycle starts at *t*(0) when the synchronizing slit of the timing comb on the read drum passes between the light source and the precision timing photocell 1313. The signal developed by the exposed photocell 1313 sets delay flop DF1. The reduction in the bias on grid of amplifier tube 1314 produces an amplified positive signal at its anode which is A.C. coupled to the grid of tube 1317. Here this signal is further amplified to produce a negative signal on the anode of tube 1317. The signal on the anode of tube 1317 is differentiated and applied to the grid of tube 1318 which is thereby cut off. The positive pulse generated on the anode of tube 1318 is A.C. coupled to DF1. Thus, tubes 1314 and 1317 amplify the signal from the PTP which is then differentiated to set DF1.

Delay flop DF1 remains set for 385 microseconds. As delay flop DF1 sets, a negative pulse is generated at the anode of its section *a* which is A.C. coupled to cut off tube 1321 of the pulse widener. The time constant of the RC network consisting of resistor 1322 and capacitor 1323 allows the pulse widener to restore after 50 microseconds.

During cutoff, the anode of tube 1321 holds the bias of tube 1324 above cutoff. When tube 1324 conducts, the negative-going signal developed across the cathode resistor 1325 is applied to the trigger grid of each of the twelve card-read thyratrons. This is the "fire read thyratron" signal. At *t*(50), the RC circuit, 1322 and 1323, allows tube 1321 to conduct again, which removes the read thyratron triggering potential and thus stops the "fire read thyratron" signal.

At *t*(385) the delay flop DF1 restores. As delay flop DF1 restores, a positive pulse is generated at the anode of its section *a* which is A.C. coupled to set both DF2 and DF4 through individual RC networks.

Delay flop DF2 remains set for 460 microseconds. As delay flop DF2 sets, a positive pulse, known as *t*(385), is generated at the anode of **1327*b* which is A.C. coupled to tube 1308** of G3. G3 is closed by a low D.C. bias potential from FF1 which prevents the *t*(385) from driving G3 above cutoff. When G3 is open, the D.C. bias potential from FF1, while below cutoff, is high enough to allow *t*(385) to drive G3 above cutoff.

Delay flop DF4 remains set for 480 microseconds. As the delay flop sets, a positive pulse, known as *t*(385–865), is generated at the anode of its section *b* which is A.C. coupled to the restoring input of FF4 and D.C. coupled to the grid of the "clear read thyratron" signal generator, tube 1330. However, the associated RC network, 1331 and 1332, delays the signal to tube 1330 for 100 microseconds after DF4 has set. At *t*(485), the positive pulse from DF4 increases the grid bias of tube 1330 to a value above cutoff. This develops the "clear read thyratron" signal. The output signal from the anode of tube 1330 decreases the bias of the clear read thyratron tubes.

At *t*(845), the delay flop DF2 is restored. As delay flop DF2 restores, a positive pulse, known as *t*(845), is generated at the anode of **1327*a*** which is A.C. coupled to set DF3. Delay flop DF3 remains set for 320 microseconds. As delay flop DF3 sets, a positive pulse, known as *t*(845–1165), is generated at the anode of its section *b* which is A.C. coupled to each of the clear write-thyratron tubes.

At *t*(865), the delay flop DF4 restores. As DF4 restores, a negative-going signal at the anode of its section *b* terminates the signal known as *t*(385–865) which is A.C. coupled to FF4, which has no effect at this time, and D.C. coupled to the grid of "clear read thyratron" signal generator, tube 1330. The associated RC network delays the signal to tube 1330 for 100 microseconds after DF4 has restored. At *t*(965), the signal through the delay network on the grid of tube 1330 cuts off the tube and terminates the "clear read thyratron" signal.

At $t(1165)$, the delay flop DF3 restores. As DF3 restores, the negative-going signal at the anode of its section $b$ terminates the $t(845\text{–}1165)$ signal. This terminates the "clear write thyratron" signal and completes the column cycle.

The column cycle, from $t(0)$ to $t(1165)$, is repeated 120 times per card cycle.

FIGURES 11$a$ and 11$b$ together show the circuits for the information channel. The information channel equipment is divided into three subdivisions:

(1) The photocells, RPC, amplifiers, and function table drivers, RT, and FT input lines, FT–1, FT–2, etc.
(2) The function table, FT–N and FT–Z.
(3) The write and clear write thyratrons, WT and CWT, and associated circuits.

Each of the twelve input channels contains a card-read photocell, RPC, an amplifier and a read thyratron, RT. Each card-read photocell, RPC, controls its associated read thyratron, RT. A common "fire read thyratron" bus is tied through an individual resistor to the screen grid of each of the read thyratrons. Only those read thyratrons which are sensitized by the exposure of the associated card-read photocell fire when the "fire read thyratron" signal is delivered at $t(0\text{–}50)$ over this bus.

Each card-read photocell has its individual amplifier. When the photocell is exposed, its resistance decreases and thereby generates a negative pulse which is A.C. coupled to the grid of the photocell amplifier. The positive pulse which appears on the amplifier anode is A.C. coupled to a line which has a lower clamp at −23 v. This line sensitizes the grid of the associated read thyratron, RT.

By means of a twelve position switch any one of the twelve sensitizing lines can be selected for microammeter reading. Adjustment is then made to compensate for individual variations. This adjustment allows a uniform signal to be received at the grids of the read thyratrons.

The "fire read thyratron" pulse from the DF1 at $t(0\text{–}50)$ drives the screen grid of all twelve RT tubes positive enough so that if the associated control grid is sensitized by being positive, the RT fires. As an RT fires, the potential drop at its anode pulls down the connected FT input line potential.

The function table is divided into two sections: zone, FT–Z, and numeric, FT–N. The function table is a resistance type matrix translating function table. Each driver or FT input line is held at the potential of the anode of the associated thyratron. The thyratrons hold the FT–Z and the FT–N input lines at an upper potential level. When a thyratron RT fires, the potential on the associated FT input line decreases to a lower potential level and the line is said to be selected or excited.

The function table output lines follow the potentials on the input lines according to the connection scheme of the FT. The potential on the output lines is normally at an upper limit nearly that of the corresponding FT input lines. Each FT output line is connected to the grid of its associated write-driver amplifier, WDA, except the odd-even check lines, OEC–N and OEC–Z, as will be explained hereinafter. The output voltage of an excited line is sufficient to cut off the associated write-driver amplifier.

When a read thyratron fires, the potential on the associated FT input line drops to the lower level. The interconnected output lines follow the voltage change. The potential on any given output line is determined by the resistance network of the FT and the particular input line excited. An excited output line drops below the cutoff of its write-driver amplifier WDA. Whenever a read thyratron fires, it causes the anode potential of all other read thyratrons and output lines in the same group to drop, since the anode circuit is common. Actually, the voltage at all points on that section of the FT decreases, but only those outputs which are selected or excited decrease sufficiently to cut off their write-driver amplifiers.

The FT encodes numerals into the excess-3 binary pulse combinations, e.g.:

| Decimal Numeral | Excess-3 Equivalent | Binary Code Combination | Write Channels |
|---|---|---|---|
| 1 | 4 | 0 00 0100 | 5 |
| 3 | 6 | 1 00 0110 | 1, 5, 6 |
| 8 | 11 | 0 00 1011 | 4, 6, 7 |

The OEC–N line from the FT–N carries a negative-going signal when the FT–N translates the 1 or the 8, but it does not carry such a signal when the FT–N translates the 3. Only those driver lines are coupled to an OEC line which do not need a check pulse in their pulse code combination. Each OEC line controls the check write thyratron, WT–1, through the quarter adder, Q, and the normally cutoff OEC amplifier. Either of the OEC lines then causes the OEC amplifier to conduct and inhibit the check write thyratron WT–1. WT–1 is normally sensitized and fires unless one OEC pulse passes through the quarter adder, which causes the associated OEC amplifier to conduct and, in turn, inhibit the check write thyratron.

When a thyratron RT fires, the associated FT input line potential decreases. There is a voltage sensitive circuit, VSC–N, associated with the anodes of the thyratrons RT of the FT–N. There are two output lines from the VSC–N: the no-numeral line N–Z, and the numeral line N–N. These lines enter the FT–Z. When the VSC–N is normal, the N–Z line is at the lower potential while the N–N line is at the upper potential. When the VSC–N is actuated, the potentials on these lines are reversed.

The VSC consists of two tubes, the normally conducting tube 1160 and the normally cutoff tube 1161, which are mutually exclusive. A potential drop, which is caused by one or more thyratrons RT conducting, is sufficient to cut off the tube 1160 and force tube 1161 above cutoff. The tube 1161 remains conducting until such time as all of the read thyratrons in section FT–N are cleared.

The main function of the N–N and N–Z lines is to indicate which of two pulse code combinations is to result from operation of the drivers to the FT–Z section of the FT. These two lines, N–N and N–Z, are resistance connected into the matrix of FT–Z. Normally, the N–N line selects write-driver amplifiers WDA–6 and WDA–7, so that card-read thyratrons RT–Y, RT–X, or RT–0 then give the corresponding interpretations of "space," WT–7, "minus," WT–6, or "zero," WT–1, WT–6, and WT7, respectively. When any thyratron in the FT–N section fires, the VSC–N switches to the other state. The N–Z line then selects write-driver amplifiers WDA–2 and WDA–3, so that card-read thyratrons RT–Y, RT–X or RT–0 then give the corresponding interpretations of zone "01," "10" or "11" pulse code. The grid of the selected write-driver amplifier is forced below cutoff and the tube stops conducting.

Since the write-driver amplifiers WDA–6 and WDA–7 may be controlled from the FT–N section during numerical work and from the FT–Z section during alphabetical work, a normally conducting plural grid tube is used in each case with the FT–N output line connected to one grid and the FT–Z output line connected to another grid. Thus either signal may cut off the tube. The increase in anode potential sensitizes the associated write thyratron, WT–6 or WT–7.

The quarter adder Q consists of three double triodes and one double diode symmetrically connected so that for a signal on either OEC–N or OEC–Z, alone, there is an output signal on OEC–T. Whenever there is no signal on either or a signal on both of the OEC input lines, there is no output signal on OEC–T.

When the potential on OEC–N decreases, tube sections

1166*b* and 1167*b* cut off. The positive-going signal on the anodes of tube 1167 is coupled through diode section 1169*b* to line OEC–T and drives the odd-even check amplifier, OECA, tube 1170 above cutoff. Tube 1170 conducts and inhibits the associated check write thyratron, WT–1. Similarly when the potential on OEC–Z decreases, tube sections 1166*a* and 1168*b* cut off. The positive-going signal on the anodes of tube 1168 is coupled through diode section 1169*a* to line OEC–T and drives OECA tube 1170 above cutoff. Tube 1170 conducts and inhibits the associated WT–1.

Whenever the potential on both OEC–N and OEC–Z decreases, the four tube sections 1166*a*, 1166*b*, 1167*b* and 1168*b* cut off. The increased potential on the anodes of tube 1166 raises the grids of tube sections 1167*a* and 1168*a* above cutoff. These tubes conduct and hold down the anodes of tubes 1167 and 1168 as if neither OEC signal exists. This holds OECA tube 1170 below cutoff and the higher potential on the OECA anode sensitizes WT–1 to fire when triggered.

The ouput from each write-driver amplifier and the OEC amplifier is buffed with a line from the error circuits before going to the screen grid of the corresponding write thyratron. The write signal from each WDA is applied directly to the screen grid of the associated write thyratron, while the signal from the OECA is normally applied to the screen grid of WT–1 through a normally closed contact of the check key at CK–4. The anode potential of each write-driver amplifier and the OEC amplifier controls the screen grid of the associated write thyratron WT. While a WDA is normally conducting, the anode potential of the WDA is below the sensitizing value for the associated WT, but when the write signal exists, the WDA is cut off, the anode potential increases above the sensitizing threshold, and the trigger pulse on the control grid fires the WT. The OECA is normally nonconducting, and therefore operates directly opposite to the WDA's, as previously described.

The "fire write thyratron" pulse from DF2 emerges at *t*(385) on the "fire write thyratron" bus. From this "fire" bus the *t*(385) pulse passes through an individual resistor, such as 1163, to the control grid of each write thyratron. Write thyratron–8 does not have an associated WDA, but its screen grid is permanently sensitized by being connected to its own cathode. The WT–8, therefore, fires every time the *t*(385) pulse occurs. The magnetic pulse written by the WT–8 is the "sprocket" pulse and identifies the position of each pulse code combination.

Normally, there is a current passing through each write winding. This erase current flows: from +152 v., through normally closed rewind contacts RW–5 to a bus. From this bus, individual paths can be traced through a resistor, a first fuse, the write winding and a second fuse to complete the circuit at +252 v. Connected at a point between the first fuse and the resistor is the thyratron circuit which, under fired condition, super-imposes a larger current which effectively reverses the current going in the write winding. Before the WT fires, current passes through the write winding in the one direction. After firing at *t*(385) and while the WT conducts, the current flows through the write winding in the opposite direction. The current in either direction is sufficient to saturate the magnetic tape.

As delay flop DF3 sets at *t*(845), it generates the "clear write thyratron" signal. This signal appears as an increased potential on a clear bus. The clear write thyratron for channel one, CWT–1, connects to this bus through a normally closed check key contact CK–5 and a grid resistor 1165. The other seven CWT tubes connect directly to the bus through their individual grid resistors.

The clear write thyratron tubes are tetrodes with, except for CWT–1, their control grids, cathodes, and screen grids connected in parallel. CWT–1 has its control grid connected through normally closed check key contact CK–5. The anodes of the CWT's are individually connected to the anodes of the associated write thyratrons. Each clear write thyratron tube is normally nonconducting. When the clear signal arrives at *t*(845), conduction occurs, and, since each CWT is connected in parallel with its associated WT, the latter is effectively short-circuited so that the potential drop across the associated write thyratron is not sufficient to maintain conduction. The associated WT is therefore cleared. As the WT's clear, the current through the write windings again flows in the original erasing direction: from +152 v., through the resistor, the winding, and to +252 v. When the delay flop DF3 restores at *t*(1165) and the potential of the normally conducting anode decreases to normal, the "clear write thyratron" signal ends and the bias on the control grids of the clear write thyratron tubes falls below cut off. The recording circuits are now ready for the next column cycle.

The fill-in operation circuits are shown on FIGURES 12*a* and 12*b*. When the Fill-In key is operated, two of the spring contacts operate before the others. They are the normally closed FK*y*–7 and the normally open FK*y*–4 and are shown in FIGURE 11*b*.

A circuit is closed through contacts FK*y*–3 to apply a positive pulse to set the Start-Stop flip-flop, FF3. This starts the tape center drive motor, but the normal card feed actuator circuit is opened by a normally closed Fill-In key contact FK*y*–5 in the line to bank-9 of the C*d*C switch. During the LE or column-0 cycle, with no card at the read station, the channel-3 card-read thyratron tube RT–3 fires. The negative-going signal from the anode of the RT–3 inhibits G1 and through inverter tube 1205 opens G2 for the positive restore pulse from FF4.

The absence of a card at the read station, causes more than two RT's to fire, during each of the first eighty column cycles of the card cycle. Under these conditions, as shown in FIGURE 17, each of the NTC lines, NTC–N and NTC–Z, gives the error signal. The voltage sensitive buffer tube 1780 generates the error symbol for each column which is written in each of the eighty card columns. The first error symbol generated by the tube 1780 sets the Error flip-flop, FF2. After the eighty card columns, the mask of the drum prevents the generation of the "error" symbol. During the next thirty-nine column cycles, the "ignore" pulse code combination, the WT–1 alone, is generated until, in the column-120 cycle, the set-output signal from FF4 passes through the open G5, tube 1782, to generate the error symbol. The restore output signal from FF4 restores the FF2 and passes through the G2 tube 1206.

The tape center drive reaches full speed before the Fill-In relay, FR*y*, operates to transfer the pulses which come out of G2 to the set input of DF6 instead of routing them to the restore input of FF1. After the delay, the Fill-In relay operates, and the pulses from G2 pass in turn through normally closed TLK–1 key contacts, through normally open FR*y*–1 relay contacts, through the C*d*C switch at bank-1 to wire 1–6, through the FK*y*–2 key contacts and TLK–4 contacts, to set the delay flop DF6, which steps the C*d*C switch ahead in the normal manner.

When the C*d*C switch has stepped ahead after the sixth card of Fill-In, the path of the FF4 restore output pulse is from FF4, through G2, through the TLK–1 key contacts, through the FR*y*–1 relay contact, through the C*d*C switch at bank-1, by wire 7–8 to the set input of the delay flop DF7. When DF7 restores 400 microseconds later, its restore pulse goes to the restore input of the Write flip-flop FF1. As FF1 restores, the decrease of potential on the anode of section *b* of FF1 closes the gate G3, and the accompanying positive-going pulse from section *a* of FF1 is A.C. coupled to buffer tube 1284.

The positive pulse generated across the cathode resistor of tube 1284 is A.C. coupled through a CR network to restore the Start-Stop flip-flop FF3, through normally open FKy–1 contacts, a network, including capacitor 1285, to the grid of Stop trigger tube to restore FF3. The converter stops with the *CdC* switch resting at logical position-7. The path of the FF4 restore output pulses to DF6 is now open at bank-1 of the *CdC* switch as it reaches position-7. The path of these pulses is now over wire 7–8 at bank-1 of the *CdC* switch, through DF7 to restore the Write flip-flop FF1.

As soon as the Fill-In key FKy is returned to normal, the FF4 restore output pulses go to the restore input of FF1, which is already restored, and to set DF6. These FF4 restore pulses go from G2, through TLK–1 key contacts, through normally closed FRy–1 relay contacts, to a branch point where one path passes through DF7, to the grid of the restore trigger tube of FF1, and the other path passes through wire 7–8 bank-1 of the *CdC* switch, through normally closed FKy–2 key contacts and TLK–4 key contacts to the grid of section *a* of DF6. Thus the LE pulses pass through FF4 and DF6 to step the *CdC* switch to position-1 again. This breaks the path of the FF4 restore pulses to DF6 so that no further stepping occurs. This completes the Fill-In cycle.

The reel motor circuits will now be described in connection with FIGURES 14*a* and 14*b*. When the Take-Up-Rewind key, TRW, is operated to Rewind position, the writing and erasing power supply are removed. As shown in FIGURE 12*b*, the +328 v. write supply is removed by the opening of TRW–4 and the +152 v. erase supply is removed by the opening of TRW–5.

When the Take-Up-Rewind key TRW is first moved to the Rewind position, capacitor 1490 is discharged through TRW–1 contact into the operate coil of Rewind relay 1, RWR1. The holding circuit for relay RWR1 is through contact RWR1–1 which shunts the charging resistor 1491 for capacitor 1490 by resistor 1492.

When RWR1 operates, it supplies power to the two-phase left or supply motor through the RWR1–2 relay contacts. The resistance winding has an adjustable resistor 1493, between RWR1–2 and the motor, while the capacitor winding has capacitor 1494 connected between the motor and the other side of the power supply. A third connection from the RWR1–2 contact supplies the rewind power for the two-phase right or take-up motor through the normally open TRW–2 contact. Contacts RWR1–3 and RWR1–4 reverse the connections of the capacitor winding of the right motor. Application of power to the left motor causes this motor to rewind the tape and the power to the right motor with reversed connections causes this motor to run at 1800 r.p.m. in the reverse direction. Due to the 3:1 gear ratio between the right motor and the tape reel, the reel runs in the counterclockwise direction at 600 r.p.m. and limits the speed of the tape. The left motor is directly connected to the tape reel, and supplies enough torque to maintain tension on the tape at all times. The tape, therefore, rewinds at a higher speed than during the take up on the forward or clockwise travel.

When the microswitch MS1 is closed at the end of the tape rewind by the rubber bumps on the tape leader, it shunts the relay RWR1, and causes it to drop out. While RWR1 was energized, the capacitor 1495 was connected between ground and +400 v. through the resistor 1496. When relay RWR1 drops out, the normally closed RWR1–5 relay contacts close a circuit which discharges capacitor 1495 into the coil of a second relay, RWR2, through resistor 1497. However, the operation of relay RWR2 is only of short duration, since resistor 1496 does not allow sufficient current to flow through the winding of RWR2 to hold it operated. Therefore, RWR2 drops out as soon as the capacitor current falls too low and reverses the connections on the capacitor winding of the right motor and restores the normal connections.

When the second relay RWR2 operates, contact RWR2–3 connects the capacitor winding of the right motor in series with the higher valued capacitor 1494 of the left motor. This gives a higher current to the right motor when running in the clockwise direction. When the brake arm controlled microswitch MS2 opens, it removes power from the resistance winding of the right motor and the rewind cycle is complete. The Take-Up-Rewind key must remain in the normal position for sufficient time, several seconds, to recharge capacitor 1490 before the rewind cycle can be repeated.

The tape loading cycle will now be discussed with reference to FIGURES 12*a* and 12*b*. During the tape loading cycle, use is made of the bad spot circuits which are fully explained in connection with FIGURE 16, hereinafter. When the Tape Load key, TLK, is first operated, the output pulses from DF6 are routed to start the converter by passing through the normally open TLK–2 key contact through an amplifier to set the Bad-Spot flip-flop, FF5, which is a resettable delay flop as shown in FIGURE 16. Start-Stop flip-flop FF3 is set by FF5, and the tape center drive motor is started. The card-feed circuit is disabled by the opening of the TLK–3 key contact.

The FF4 restore output pulses are routed to the DF6 through gate G2, through the normally open TLK–1 key contact and through bank-2 of the BkC1 switch. The set output pulses from DF6 step the *CdC*. The interval between successive pulses from the set output of DF6 is less than the set time interval of FF5, so the successive DF6 output pulses reset FF5 over the circuit described above to first set FF5, thereby maintaining the converter in running condition. The FF4 restore output pulse circuit changes as bank-2 of the BkC1 switch steps into position-18. The FF4 restore output pulses are then routed through bank-2 of B*k*C1, through bank-7 of the *CdC* in position-6 to -8 to DF6. When the *CdC* switch reaches position-1, a further change of routing of these pulses occurs. The next FF4 restore output pulse is then A.C. coupled to restore the Start-Stop flip-flop FF3 and stop the converter. If a bad spot is sensed by the bad spot photocell before the last cycle is completed, FF5 is reset and the steady signal from the Bad Spot flip-flop FF5 overrides the effort of this pulse to restore FF3 and stop the converter. The converter then continues to feed tape until FF5 restores and thereby restores FF3 and stops the converter, as will be explained hereinafter in describing the bad spot circuits.

After the tape loading cycle, the TL key must be returned to normal in order that the LE pulses can be routed properly to the Card Counting delay flop DF6.

FIGURE 15 shows the circuits for reset of the counting switches. When the Reset key, RCS, is first operated, two circuits are closed. These circuits apply power to the actuating coil of the B*k*C1 and B*k*C2 switches to advance their wipers to home or position-0. In the first circuit, current flows from 110 v. A.C.–Y, through normally open Reset key contacts RCS–1, through the normally open Off-Normal, O–N, contacts of B*k*C1, through the interrupter, INT, contacts of B*k*C1, through the actuating coil of B*k*C1 to 110 v. A.C.–X. The B*k*C1 armature operates and its interrupter contacts open. The armature releases and, on the return stroke, advances its wipers to the next position. At the end of the stroke, the interrupter contacts reclose the circuit. This stepping cycle repeats until the B*k*C1 switch moves its wipers into position-0, at which time the O–N contacts of B*k*C1 open. In the second circuit, current flows from 110 v. A.C.–Y, through normally open Reset key contacts RCS–2, through normally open O–N contacts of B*k*C2, through the interrupter, INT, contacts of B*k*C2, through the actuating coil of B*k*C2 to 110 v. A.C.–X. This stepping cycle repeats until the B*k*C2 switch moves its wipers into position-0 at which time the O–N contacts of B*k*C2 open.

When the Reset key is released, the RCS contacts assume normal positions. The normal position of RCS–3 closes a circuit to advance the B*k*C1 switch from position-0 to position-1. This circuit is from 110 v. A.C.–Y, through the normally closed Reset key contacts RCS–3, through the normally closed O–N contacts of the B*k*C1 switch, through the interrupter contact and actuating coil of the B*k*C1 switch to 110 v. A.C.–X. Thus the switch advances to position-1 where the O–N contacts of B*k*C1 change.

The start recording operation will now be described in connection with FIGURE 12*b*. When the Start-Stop key is pulled into the Start (STT) position, the discharge of capacitor 1271 generates a positive pulse which is communicated through normally open STT–1 key contact to set Start-Stop FF3. This positive pulse causes Start trigger tube to conduct momentarily and forces section *b* of FF3 to conduct and thus set FF3.

Whenever the Start-Stop flip-flop FF3 changes from either set or restore condition, the delay flop DF5 sets. A positive pulse always comes from one anode or the other as FF3 changes; this pulse is A.C. coupled to tube section 1273*b* or to tube section 1273*a* for the set and restore actions, respectively. The common anode circuit of these two tube sections is connected to the anode of the normally nonconducting tube section 1274*a* of DF5. The positive pulse from either anode of FF3 always causes one half of the tube 1273 to conduct momentarily, and the resultant negative pulse from tube 1273 always sets delay flop DF5 by driving the anode at section *a* less positive and the A.C. coupled grid at section *b* below cutoff.

The DF5 restores after 300 milliseconds. During the set time of DF5, an inhibiting negative signal is maintained on tube 1276 of G4. The positive signal from the set anode of FF3 at section *a* is connected to operate both the Card-Feed and Tape Center Drive. For the former, the signal passes successively through tape load key contacts TLK–3 , through Fill-In key contacts FK*y*–5, through C*d*C switch bank–9 contacts, across the contacts of which is a spark suppressing capacitor, to the control grid of tube 1248. When this tube conducts, it energizes the Card-Feed actuator. The neon indicating lamp 1255 glows while tube 1248 is conducting. For the Tape Center Drive, the signal passes through resistor 1256 to the grid of tube 1253 causing it to conduct. When this tube conducts, it energizes the Hg motor control relay which operates the Tape Drive motor. The neon indicating lamp 1258 glows while tube 1253 conducts. Diode 1259 is an upper clamp on the control grid of tube 1253.

The tape accelerates to running speed during the time required for the first card to progress from the feed station at the end of the supply bin to the read station.

Special operations are described in detail as follows:

(1) Operator stop
(2) Functional check, or fault detection
(3) Bad-spot circuit
(4) Error detection
(5) Out-of-card circuit
(6) Full-bin circuit
(7) End-of-tape circuit The operator stop action is controlled by moving the Start-Stop key into Stop position. When the Start-Stop key is moved into the Stop position, the Start-Stop FF3 is restored by grounding the grid of the stop trigger tube through the STP–1 stop key contacts.

As FF3 restores, it stops the Card-Feed and removes the "running" potential from the Tape Drive. The card feed action is stopped by decreasing the control grid bias for tube 1248 through D.C. coupling to the anode of the normally conducting section of FF3 via bank–9 of the C*d*C switch at position-1 to -4. This causes tube 1248 to cut off and disable the card-feed system The tape drive acion is stopped by decreasing the control grid bias on tube 1253 by action at the anode of the normally conducting section of FF3.

As FF3 restores the positive pulse from the anode of section *b* of FF3 sets DF5. DF5 remains set for 300 milliseconds. While set, DF5, instead of FF3, keeps the Tape Drive running by applying an overriding potential to tube 1253. The cards in transit are recorded during the 300 millisecond interval determined by DF5. As DF5 restores, it removes the overriding signal on tube 1253 and the tape center drive stops.

The functional checking circuit will now be described in detail. When the Check key, CK, is moved into Check position, the two inputs to the quarter adder Q are transferred to pick up the error indication NTC–N and –Z from the respective sections FT–N and –Z of the function table. This is shown in FIGURE 11*a* where CK–2 transfers the grid of tube 1166*b* from receieving the OEC–N to receive the NTC–N through a tap between resistors 1735 and 1736, and CK–3 transfers the grid of tube 1166*a* from receiving the OEC–Z to receive the NTC–Z from a point between resistors 1737 and 1738. The quarter adder Q emits a negative signal only when there is a disagreement between the two input signals; whenever they agree, i.e. both present or both absent, there is no quarter adder Q output signal.

As shown in FIGURE 11*b*, during proper operation the signal on the anode of tube 1170 is positive and is used to prevent WT–1 from firing by passing it in turn through Check contact CK–7, an inverter tube 1178, contact CK–4, to the screen grid of the WT–1. The normally positive potential holds tube 1170 conducting and its lower anode potential desensitizes the screen grid of WT–1. When, during the check run, any prohibited punched hole combination occurs, more than one thyratron fires in that section of the FT and the normal error circuit functions.

A distinction is made between a Fault and an Error. A fault is a malperformance or faulty operation of the converter during the functional check. An error is an uninterpretable punching in the cards fed into the converter for which a special symbol is substituted.

When the NA switch is set in position-A, the "error" symbol generates a pulse on the OECA output line, which follows the path described, to sensitize the WT–1 to fire at *t*(385). Whenever a pulse appears on the OECA output line during the check procedure, it indicates a fault which should stop the converter. This negative-going Fault indicating pulse passes through CK–7 and forces the grid of tube 1178 below cutoff. The positive anode signal sensitizes WT–1 after passing through CK–4 to the screen grid of WT–1. The lower potential on the anode or WT–1, which is A.C. coupled to the FF3 trigger tube for section *a*, restores FF3. The contact CK–5 transfers the control grid of the clear tube CWT–1 from the "clear write thyratron" line to power at +100 v. in order to prevent WT–1 from clearing at *t*(845–1165).

The C*d*C switch suppresses card-7 and -8 in each block. The absence of a card at column-0 not only causes more than two RT's to fire in each FT section, thereby giving both the NTC–N and –Z signals but also inhibits G1 and opens G2. Due to the delay action of DF7, the positive signal through G2, when FF4 restores, will not restore FF1 until after the write fire pulse at *t*(385). Therefore, the positive output pulse at *t*(0) from FF4 which is A.C. coupled to the trigger tube of FF1 section *b*, restores FF1 through the normally open CK–6 key contacts. The positive output pulse at *t*(385) from the restore output of FF4 is A.C. coupled either to the trigger tube of FF1 section *b* which restores FF1, or to the trigger tube of FF1 section *a* which sets FF1 depending upon which of the gates, G2 or G1, respectively, is open. The path of the signal to restore FF1 is through G2, Tape Load key contacts TLK–1, Fill-In relay contacts FR*y*–1 and a 400 microsecond delay in DF7 to FF1. The path of the signal to set FF1 is through G1 directly to FF1.

FIGURE 16 shows the details of the Bad Spot detection circuits. When the Bad Spot photocell 1615 receives light through a bad spot hole, its resistance decreases and causes capacitor 1616 to be discharged through thyratron tube 1617. The negative pulse, which is generated when the photocell is exposed, is coupled to cut off tube 1618.

The positive pulse from the anode of tube 1618 triggers the thyratron 1617 into conduction. The capacitor 1616 is effectively shorted by the thyratron 1617 and discharges through resistors 1619 and 1620.

As the capacitor 1616 discharges, the positive pulse developed at the cathode of the thyratron 1617 sets Bad Spot flip-flop FF5 by forcing trigger tube 1621 into conduction momentarily. The neon indicating lamp 1622 glows while FF5 is set. The tape center drive tube 1253, shown in FIGURE 12*b*, is held above cutoff and Start-Stop FF3 is restored to stop the card-feed. The negative signal which appears when FF5 sets, has no effect, but the higher potential on normally conducting tube section 1623*a* of FF5 is D.C. coupled to the control grid of tube 1253, and through *C*d*C* bank-10 is A.C. coupled to the Start-Stop flip-flop FF3. When the *C*d*C* switch is in position-5 or -6, the card feed actuator is opened at bank-9. Therefore, if the Card Feed and Writing circuits are disabled while *C*d*C* switch is at such positions, the single start pulse to set the FF3 would not be sufficient to return the converter to normal operation.

The Start-Stop FF3 restores either immediately when FF5 sets or later when the *C*d*C* switch couples the FF5 positive signal to restore the FF3. For this reason, the *C*d*C* switch at bank-10, closes this circuit from FF5 to restore FF3 trigger tube only during position-8 to -1 and leaves this circuit open during position-2 to -7, inclusive. While tube 1253 is held conductive, the tape center drive continues to run and pull the bad spot beyond the write head. With FF3 restored, the card-feed actuator is released by the lower potential on the anode of FF3 tube section *a* which pulls tube 1248 below cutoff.

Because of the combined effects of the delay in restoring FF3 and the transit time required for the card to progress from the feed station to the read station, the bad spot hole must be read sufficiently in advance of the write station to allow all released cards to write before the bad spot on the tape arrives at the write head.

Discharge of capacitor 1616 continues until there is insufficient potential across tube 1617 to maintain conduction, then tube 1617 automatically extinguishes. When thyratron tube 1617 extinguishes, the potential across capacitor 1616 is about −90 v. This potential drives tube 1624 below cutoff and the resulting higher potential on its anode holds the associated grid tube section 1623*b* above cutoff and maintains FF5 in the set condition.

As soon as the thyratron 1617 is cleared, the capacitor 1616 starts to charge from the +240 v. source through resistor 1625. While the potential across the capacitor 1616 is low, the resulting negative potential on the grid of tube 1624 cuts it off and thereby holds tube section 1623*b* cut off. As the capacitor 1616 charges, the potential on the grid of tube 1624 gradually increases until, as it approaches zero volts, it permits the tube 1624 to start to conduct. The full value of the current of this tube is established gradually. As conduction through the tube 1624 increases, the potential of its anode drops. The Bad Spot flip-flop FF5 stays set as long as the potential on the anode of the tube 1624 is high enough. As the conduction through this tube increases and its anode potential decreases, a point is finally reached when tube section 1623*b* is cut off which then restores FF5.

The charging time for capacitor 1616 to reach this trigger value is about three seconds during which time the Bad Spot FF5 is held in the set condition and about 30 inches of tape pass the write head. If a bad spot is longer than this, a succeeding hole in the tape re-exposes the Bad Spot photocell and the thyratron 1617 is refired, thus discharging the capacitor 1616 again and starting the time period of three seconds over again. During each bad spot the converter is in nonfeeding and nonrecording condition.

The lower potential at FF5 section *a* output when FF5 restores has no effect, but the positive signal from FF5 section *b* output is coupled to the grid of the FF3 trigger tube to set FF3, as shown in FIGURE 12*b*. When this pulse arrives, FF3 trigger tube conducts momentarily and generates the negative pulse to set the Start-Stop FF3. In the set condition, the FF3 holds the grid of center drive control tube 1253 above cutoff and, through bank-9 of *C*d*C* switch, also returns the grid of card feed control tube 1248 above cutoff. This causes the cards to feed again.

Reference will now be made to the detailed diagram of the error detection circuits, shown in FIGURE 17. The NT–N line shown in FIGURE 11*a* is connected to all of the driver or input lines of the FT–N section of the function table and the NT–Z line is connected to the three driver or input lines of the FT–Z section. This is accomplished through the common anode circuit of each set of thyratrons. The read thyratrons RT for section FT–Z receive power through clear read thyratron tube 1730, CRT–Z. The read thyratrons RT for section FT–N receive power through whichever clear read thyratron tube, 1731 (CRT–N) or 1730 (CRT–Z), is selected by the setting of the NA switch, position-A or -N, respectively. The anode of tube 1731 is connected through the voltage sensitive circuit, VSC–N, to two lines which also enter the FT–Z, as shown in FIGURE 11*a*. The VSC–N is obtained by measuring the drop in the potential across the anode resistor 1732 of the CRT–N tube 1731.

The signal on the anode of each of the clear read thyratron tubes passes through its own voltage sensitive buffer, VSB–N or –Z, which are combined in tube 1733, to the NTC–W line. For the VSB–N, the potential from the anode of the CRT–N, the NTC–N signal, is applied to the screen grid of tube 1733. For the VSB–Z, the potential from the anode of the CRT–Z, the NTC–Z signal is applied to the control grid of tube 1733. The potential drop across each of tubes CRT–N and CRT–Z when less than two card-read thyratrons RT are conducting is above the cutoff value for the tube 1733. However, the potential on either of these anodes when two or more card-read thyratrons RT are conducting is below the cutoff of tube 1733.

Since numerical work uses only one perforation while alphabetic work uses two, the NA switch connects the NT–N signal to clear read thyratron CRT–N for alphabetic work when in position-A and connects the NT–N signal to the same buffer as the FT–Z signal, CRT–Z, for numerical work when in position-N.

The combined output of the VSB–N and VSB–Z lines, NTC–W (write), passes through one stage of the NA switch to generate the error symbol at the write thyratrons or through an inverter, I, tube 1734 to become NTC–I (inhibit) and another stage of the NA switch to inhibit those WT's not used in the error symbol. The write thyratron WT–2 is not used in either of the error pulse combinations. The inhibit signal NTC–I from the inverter, therefore, goes directly to the WT–2 without passing through the NA switch.

When an error is indicated by more than one RT conducting on the line NTC–Z or NTC–N to either of the grids of the VSB tube 1733, the tube 1733 cuts off. The higher potential on the anode of tube 1733 produces a signal on line NTC–W. This positive-going potential NTC–W always passes through one pole of the NA switch to be buffed into three of the write thyratron sensitizing lines. When the NA switch is in position-N the three thyratrons are WT–1, WT–4, and WT–5 which record the coded symbol for the numeral 9. When the NA switch is in position-A the three thyratrons are WT–3, WT–6, and WT–7 which record the symbol for the semicolon.

The positive-going NTC–W signal from the anode of the VSB tube 1733 is also applied to inverter tube 1734. When the NA switch is in position-N, the inverted NTC–I signal goes to the thyratrons WT–3, WT–6, and WT–7. When in position-A, the NTC–I signal goes to the thyratrons WT–1, WT–4, and WT–5. Regardless of the position of the NA switch, the inverted signal NTC–I always goes to the WT–2.

The positive-going signal NTC–W which comes directly from the VSB, generates the error signal, and the inverted signal NTC–I from the inverter tube 1734 prevents the unwanted WT's from firing.

The positive-going signal NTC–W from the anode of the VSB is also coupled to set the Error flip-flop FF2, passing through capacitor 1735 to the set trigger tube 1736. Neon indicating lamp 1737 glows while FF2 is set. The set signal from FF2 is D.C. coupled to the open G5 which is ready for the positive signal from the LE FF4 as it sets.

Every time an error occurs on a card, the buffer VSB tube 1733 generates a positive signal NTC–W which becomes the error symbol pulse code combination to be substituted in that column where the error occurred and also sets the error notation FF2.

During the column-120 cycle, the condition of FF2 is inspected. When the LE photocell sets the LE FF4 at *t*(0) during the column-120 cycle, the positive signal from the LE FF4 is stopped at G5 if FF2 is restored, or passes through G5 if FF2 is set. When the pulse passes through G5, it enters the NTC–Z line and operates the VSB tube 1733 to generate the error symbol in the standard manner. When the LE FF4 restores at *t*(385) during the column-120 cycle, the positive pulse from FF4 restores FF2 through its restore trigger tube 1738. The neon indicating lamp 1737 is extinguished as FF2 restores.

The out-of-cards operation is described in connection with FIGURES 12*a* and 12*b*. If a card fails to appear at the read station when one is expected, the channel–3 card-read thyratron RT–3 fires. When RT–3 fires, its anode potential drops. This signal closes G1 by an excessive negative bias on tube 1204 and opens G2 through tube 1205 by raising the bias of tube 1206 nearly to cutoff.

With G1 closed and G2 open, the LE *t*(385) positive pulse cannot overcome the excessive bias of tube 1204 but does drive tube 1206 above cutoff momentarily. The resultant positive pulse on the cathode of tube 1206 triggers and sets delay flop DF7 and passes through G4. These pulses travel a common path through contacts TLK–1 and FRy–1. The signal then passes either through the 7–8 wire at bank–1 of the C*d*C switch to DF6, or through the 1–6 wire at bank–2 of the C*d*C switch to G4. If G4 tube 1276 is open, the pulse passes through and the resulting positive pulse on the cathode resistor 1277 is coupled to the stop trigger tube of FF3 to restore FF3. This stops the card-feed actuator and tape center drive.

After 500 microseconds, the DF7 restores and emits a positive pulse which is coupled to restore Write FF1 through its trigger tube 1286. Thus the Write FF1 is restored and FF1 closes G3, as shown in FIGURE 13, by decreasing the bias of tube 1308 to a value below its cutoff point. The gate G3 prevents passage of the "fire write thyratron" pulse at *t*(385) and no recording or Write action occurs.

The full bin control is shown in FIGURE 12*b*. As the Output Bin tray reaches its lower limit, it stops the card feed and lights the Output Bin Full lamp. This is accomplished by a double throw single pole microswitch MS6 which transfers the +196 v. from the screen grid of the card feed control tube 1248 and applies it to the Output Bin Full neon indicating lamp.

As shown in FIGURE 14, when the end of a tape is reached, the rubber bumps which are fastened to the end of the tape catch between a pulley and a post. Although no more tape can pass this point, the tape center drive continues to draw tape from the left loop which then shortens until the microswitch MS2 operates and transfers the A.C. supply from the right or take-up motor to the No Tape light. This light indicates that recording was allowed to be made too close to the end of the tape. No attempt is made to stop the feeding of cards, since the run must be repeated.

Where a diode is shown, one section of the dual diode commercial type 6AL5 or 25Z6 has been satisfactorily applied. Where a triode is indicated, one section of the dual triode type commercially designated as 6SN7 has generally been found satisfactory. Where a tetrode is indicated, the commercial type 6CD6 has been found satisfactory, and where thyratrons are shown, the type 2050 has given satisfactory results. Where a pentode is shown, the commercially designated tube type 25L6 has been found satisfactory, and where a multiple control grid tube is indicated the commercial type 5915 has given satisfactory results. The operating circuit impedances have been chosen, in conjunction with the operating potentials and the characteristics of aforesaid vacuum tubes, to provide the necessary signal and control potentials. Although vacuum tubes have been referred to in the course of the discussion of the invention, it will be understood that any other device or system having suitable valving or control properties may also be employed such as, without limitation, magnetic amplifiers, transistors, and the like.

The drum card feeding mechanism per se is disclosed and claimed in patent application Serial No. 214,132, filed March 6, 1951, now abandoned, entitled "Card Handling and Punching," while the checking system per se is disclosed and claimed in patent application Serial No. 259,865, filed December 4, 1951 now Patent No. 2,677,815, entitled "Photoelectric Checking Circuit." Reference is made to the above identified inventions since they find an aplication in the instant invention.

What is claimed is:

1. In combination, an information source delivering information of numerical and non-numerical types, an information entering device adapted for entering information corresponding to information from said source on an information receiving medium, apparatus linking said source and said entering device, apparatus for sensing errors in numerical information, apparatus for sensing errors in non-numerical information, means linking said error sensing apparatus and said entering device for entering on said medium a first type of error notation in place of an error bearing numerical item and a second type of error notation in place of an error bearing non-numerical item.

2. In combination, a feed system for information items, information entry apparatus entering information on a record receiving medium under the control of information present in said items, an entry monitor halting the entry of information on said record receiving medium under the control of information present in said items after the handling of a predetermined number of items by said feed system, and apparatus entering a predetermined number of standard items on said record receiving medium after said entry monitor has been activated.

3. In combination, a sensing station, driving apparatus moving a record bearing member past said sensing station, a signal source controlled by said driving apparatus for producing sequential signals at cyclic intervals correlated with the progress of said record bearing member past said sensing station, a storage register conditioned by signals from said signal source to accept data from said sensing station in response to a first one of said sequential signals, apparatus for recording the contents of said storage register on a record receiving medium, and apparatus clearing said storage register in response to a second one of said sequential signals.

4. In combination, a record impressing station, driving apparatus displacing a record receiving medium past said record impressing station, said record receiving medium being characterized by suitable and non-suitable record receiving portions, means for sensing said non-suitable portions, and means responsive to said sensing means for disabling said record impressing station for a predetermined time after sensing a non-suitable portion on said medium.

5. In combination, an apparatus for feeding information bearing tallies, an apparatus for scanning said tallies, an information receiving member, apparatus for entering information on said information receiving member under the control of information derived from scanning said tallies, transport apparatus for moving said information receiving member past said information entering apparatus, apparatus for sensing the absence of a tally at said scanning apparatus, and apparatus responsive to said sensing apparatus for interrupting the operation of said information entering apparatus and for providing control signals for disabling said feeding apparatus and said transport apparatus.

6. The combination according to claim 5 in which said record receiving member is magnetic.

7. The combination according to claim 5 in which said scanning apparatus comprises photoelectric means.

8. The combination according to claim 5 in which said sensing apparatus comprises photoelectric means.

9. The combination according to claim 5 in which both said scanning apparatus and said sensing apparatus comprise photoelectric means.

10. The combination according to claim 9 in which at least one of said photoelectric means is operatively associated with both said scanning apparatus and said sensing apparatus.

11. In combination, an apparatus for feeding information bearing tallies, an apparatus for scanning said tallies, a continuously moving information receiving member, said member being characterized by the presence of portions having suitable and non-suitable record receiving portions, an apparatus for entering information on said information receiving member under control of information derived from scanning said tallies, apparatus for sensing said non-suitable portions, and apparatus responsive to said sensing apparatus for interrupting the operation of said tally feeding apparatus.

12. In combination, an apparatus for feeding information bearing tallies, an apparatus for scanning said tallies, a continuously moving information receiving member, said member being characterized by the presence of portions having suitable and non-suitable record receiving portions, an apparatus for entering information on said information receiving member under control of information derived from scanning said tallies, apparatus for sensing said non-suitable portions, and apparatus responsive to said sensing apparatus for interrupting the operation of said information entering apparatus.

13. In combintion, an apparatus for feeding information bearing tallies, an apparatus for scanning said tallies, a continuously moving information receiving member, an apparatus for entering information on said information receiving member under control of information derived from scanning said tallies, a radiation screen of variable transmissibility moveable in predetermined relation to the feeding of said tallies, a source of uniformly recurring electric impulses controlled by said radiation screen, and said information entering apparatus being triggered by said uniformly recurring electric impulses.

14. The combination according to claim 13 in which said information receiving member is magnetic.

15. The combination according to claim 13 in which said radiation screen is operatively associated with photoelectric means.

16. The combination according to claim 13 comprising a second radiation screen of variable transmissibility moveable in a second predetermined relation to the feeding of said tallies, a second source of electric impulses simultaneously applied with selected ones of said uniformly recurring electric impulses, and a starting device within said information entering apparatus being periodically triggered by the impulses from said second source.

17. The combination according to claim 16 in which said information receiving member is magnetic.

18. The combination according to claim 16 in which said first and second radiation screens are operatively associated with photoelectric means.

19. In combination, an information source adapted to deliver a predetermined quantum of information, an information receiving medium, means for entering on a first area of said medium the information delivered by said source, signal generating means thereafter operative for a predetermined time to deliver to said entering means information of a standard type independent of information supplied from said source for entry on a second area of said medium, apparatus for detecting errors in the information delivered by said information source, and means linking said error detecting apparatus to said entering means and controlled by said error detecting apparatus for entering an error notation in said first area at a place corresponding to the location of the error bearing data item and in said second area at a standard location in place of the corresponding independent entry.

20. In combination, apparatus adapted to move an information receiving member, apparatus for scanning and periodically feeding information-bearing tallies, apparatus for entering information on said information receiving member under the control of said scanning apparatus, apparatus for counting the number of scanned tallies, and apparatus responsive to said counting apparatus for disabling said tally feeding apparatus after a predetermined number of tallies have been scanned.

21. In combination, a sensing station, first driving apparatus moving a record bearing member past said sensing station, a record impressing station, second driving apparatus displacing a record receiving medium past said record impressing station, said record receiving medium being characterized by suitable and non-suitable record receiving portions, means for sensing said non-suitable portions, and means responsive to said sensing means for disabling said first driving apparatus for a predetermined time after sensing a non-suitable portion on said medium.

22. In combination, an apparatus for feeding information bearing tallies, an apparatus for scanning said tallies, an information receiving member, apparatus for entering information on said information receiving member under the control of information derived from scanning said tallies, transport apparatus for moving said information receiving member past said information entering apparatus, apparatus for sensing the absence of a tally at said scanning apparatus, and apparatus responsive to said sensing apparatus for interrupting the operation of said information entering apparatus and for providing control signals for disabling said feeding apparatus and said transport apparatus, means for initiating said tally feed, and means responsive to said initiating means for nullifying said control signals.

23. In combination, an apparatus for feeding information bearing tallies, an apparatus for scanning said tallies, an information receiving member, apparatus for entering information on said information receiving member under the control of information derived from scanning said tallies, transport apparatus for moving said information receiving member past said information entering apparatus, apparatus for sensing the absence of a tally at said scanning apparatus, and apparatus responsive to said sensing apparatus for interrupting the operating of said information entering apparatus and for providing control signals for disabling said feeding apparatus and said transport apparatus, means for cyclicly suppressing said tally feed, and means responsive to said suppressing means for nullifying said control signals.

24. In combination, scanning apparatus, apparatus for feeding an information bearing member past said scanning apparatus, an information receiving member, apparatus for entering information on said information receiving member under the control of information derived from scanning said information bearing member, apparatus for sensing the absence of said information bearing member at said scanning apparatus, and apparatus responsive to said sensing apparatus for interrupting the operation of said information entering apparatus.

25. In combination, an information source, an information entering device responsive to said source and adapted to cooperate with an information receiving medium for entry of information from said source in a first region of said medium, an error detector coupled to said information source for sensing errors in information from said source and for generating a signal in response to said errors, storage apparatus coupled to said error detector for storing the signal generated in response to said detected errors, means coupling the error detector and storage apparatus to said entering device for forcing said entering device to enter in said first region on said medium an error notation in place of a detected error and at a standard location in a second region of said medium in response to the stored signal in said storage apparatus.

26. In combination, first apparatus adapted to move an information receiving member, second apparatus for reading information bearing tallies, third apparatus for entering information on a first region of said information receiving member under the control of information derived from reading said tallies, fourth apparatus linked to said third apparatus for making entries independent of information derived from reading said tallies in a second region of said information receiving member, an error detector for detecting errors in the information resulting from the reading of said tallies, and means linking said error detector and said third apparatus for entering an error notation on said information receiving member in place of an error bearing information item.

27. In combination, first and second information sources, first and second encoding devices each having a plurality of input and output means, said first and second information sources being respectively linked to said first and second encoding devices by said plural input means, code combining means coupled to the plural output means of said first and second encoding devices for combining the encoded information from said first and second information sources into a resultant code and for producing output signals respresentative of said resultant code, information recording apparatus responsive to the output signals of said code combining means for recording said resultant coded information on an information receiving medium, and control apparatus coupled to said plural input means and to said code combining means effective to interrupt the control exercised by said encoding devices over said code combining means when said control apparatus detects the actuation of more than one input means of either of said encoding devices.

28. In combination, an information bearing medium bearing information in a first coded representation, first apparatus for sensing a predetermined invariant quantum of information from said information bearing medium and for thereafter automatically generating a predetermined invariant quantum of signals of a standard type independent of information impressed on said information bearing medium, code conversion apparatus coupled to said first apparatus for converting the information sensed in said first coded representation into a different coded representation and for producing output signals corresponding to said different coded representation, an information receiving medium, and second apparatus coupled to said code conversion apparatus and said first apparatus and responsive to said code conversion apparatus output signals and said automatically generated signals for making entries on said information receiving medium, said output signals being entered on a first area of said information receiving medium and said automatically generated signals being entered on a second area of said information receiving medium.

29. In a machine for converting information in a first code carried by record cards to a second code and for recording said second code onto a continuous record receiving medium, the combination of a plurality of record cards bearing information in a first code, first apparatus for sensing a predetermined invariant quantum of information from each of said plurality of record cards and for automatically generating a predetermined in variant quantum of signals of a standard type independent of information impressed on said record cards after each individual record has been sensed, means for successively displacing the record cards past said first apparatus, code conversion apparatus coupled to said first apparatus for converting the sensed information into a second code and for producing output signals corresponding to said second code, a continuous record receiving medium, and second apparatus coupled to said code conversion apparatus and said first apparatus and responsive to the output signals from said code conversion apparatus and said automatically generated signals for making entries on said continuous record receiving medium, said output signals being entered on a first area of said record receiving medium and said automatically generated signals being entered on a second area of said record receiving medium.

30. The combination of claim 29 wherein the information on said record cards is represented by perforations in said cards, and said continuous record receiving medium is a magnetizable tape.

31. A data processing device for translating data delivered from a first storage medium having a series of consecutive storage locations adapted to store alphabetic and/or numeric data according to a prescribed arbitrary digital value scale including single digit representation for numeric characters and first and second digit represenation for alphabetic characters with bit elements of storage in each digital position according to a first code configuration for delivery to a second storage medium adapted to store data according to a second code configuration including a numeric element representation for numeric characters and zone and numeric element representation for alphabetic characters comprising a plurality of input signal lines for receiving bit element signals signficant of digital representations according to the first code configuration from the first storage medium, a plurality of output signal lines according to the second code configuration for delivering signals to the second storage medium, a translator having a first digit section and a second digit section for receiving the first and second digit representations, and means coupled with said first and second digit sections for selectively gating the digital character representations through the translator for application to said output signal lines, said first digit section being responsive to first digit representations of alphabetic characters for conversion into zone element representations according to said second code configuration, said second digit section being responsive to second digit representations of alphabetic characters and single digit representations for numeric characters for conversion into numeric element representations according to said second code configuration.

32. In a data translating system for alphabetic and numeric data, the combination of a first storage device for a word of data intermixed with alphabetic and numeric characters, said word including a plurality of zone and numeric digit positions for storing data thereat in first coded character representations, each alphabetic character requiring a zone and numeric digit position and each numeric character requiring at least a numeric digit position in the first code, data translating means including first and second sections, selectively operated data transmission means associated with said first and second sections and said first storage device, means for selecting all of the zone characters in said first storage device representing alphabetic data for delivery over said transmission means to said first translating section and for selecting all of the numeric digit positions representing both alphabetic and numeric data for delivery to said second translating section, a second data storage device having zone and digit positions for storing data in second coded character representations, means for connecting said second storage device to said first and second translating sections to receive the translated data for storage in the zone and numeric digit positions in the second coded character representations, means for detecting numeric values in the alphabetic data word, and means responsive to the detection of the numeric values for modifying the operation of the translating means to maintain the identity of the numeric values.

33. A device for translating data from a first storage medium to a second storage medium,
- said first storage medium having a first plurality of storage locations and a second plurality of storage locations, alphabetic and/or numeric data according to a prescribed arbitrary digital value scale being represented by a single digital position in at least one of said two pluralities of locations, and
- said second storage medium having a third and a fourth plurality of element storage positions for each character representation according to a combination code configuration,
- said device comprising
  - means for reading data stored in said first plurality of storage locations,
  - means for reading data stored in said second plurality of storage locations,
  - means for recording data onto said third plurality positions of said second storage medium,
  - means for recording data onto said fourth plurality positions of said second storage medium,
  - a translator having a first section and a second section,
  - first coupling means for coupling said first plurality reading means to said first section,
  - second coupling means for coupling said second plurality reading means to said second section,
  - third coupling means for coupling said first section to said third plurality recording means,
  - fourth coupling means for coupling said second section to said fourth plurality recording means,
  - means coupled to said first and second coupling means and to said translator, and responsive to the presence of a single digital position in said first plurality of storage locations and the absence of a digital position in said second plurality of storage locations, for modifying the translation produced by said translator, and
  - means coupled to said first, second, third, and fourth coupling means for selectively gating data from said first and second plurality reading means, to said translator, and to said third and fourth plurality recording means.

34. In combination,
- means for reading data recorded in a first storage medium having a first plurality of parallel channels,
- a first storage register having said first plurality of stages, said storage register being coupled to said reading means,
- a code converter coupled to the output of said storage register,
- a second storage register, having a second plurality of stages, being coupled to the output of said code converter,
- means for recording data onto a second storage medium having said second plurality of parallel channels, said recording means being coupled to the output of said second storage register, and
- means for repeatedly activating and clearing said first and second storage registers.

References Cited in the file of this patent

UNITED STATES PATENTS

| | | |
|---|---|---|
| 1,050,203 | Bickley | Jan. 14, 1913 |
| 1,110,872 | Borschneck | Sept. 15, 1914 |
| 1,394,565 | Long | Oct. 25, 1921 |
| 1,972,326 | Angel | Sept. 4, 1934 |
| 2,034,364 | Whitney et al. | Mar. 17, 1936 |
| 2,120,378 | Tauschek | June 14, 1938 |
| 2,353,327 | Warwick | July 11, 1944 |
| 2,382,251 | Parker et al. | Aug. 14, 1945 |
| 2,397,202 | Potts | Mar. 26, 1946 |
| 2,471,126 | Spencer et al. | May 24, 1949 |
| 2,512,038 | Potts | June 20, 1950 |
| 2,518,405 | Van Durren | Aug. 8, 1950 |
| 2,536,528 | Baldwin | Jan. 2, 1951 |
| 2,543,435 | Buckley | Feb. 27, 1951 |
| 2,546,819 | Gooderham | Mar. 27, 1951 |
| 2,547,525 | Hague | Apr. 3, 1951 |
| 2,550,427 | Potts | Apr. 24, 1951 |
| 2,554,835 | Mallina | May 29, 1951 |
| 2,573,718 | Kleinschmidt | Nov. 6, 1951 |
| 2,586,669 | Lake | Feb. 19, 1952 |
| 2,587,532 | Schmidt | Feb. 26, 1952 |
| 2,595,714 | Slayton | May 6, 1952 |
| 2,599,392 | Kille | June 3, 1952 |
| 2,604,538 | Halvorsen | July 22, 1952 |
| 2,613,267 | Durkee | Oct. 7, 1952 |
| 2,614,169 | Cohen et al. | Oct. 14, 1952 |
| 2,616,965 | Hoeppner | Nov. 4, 1952 |
| 2,657,856 | Edwards | Nov. 3, 1953 |
| 2,684,718 | Lunn | July 27, 1954 |
| 2,693,593 | Crosman | Nov. 2, 1954 |
| 2,737,342 | Nelson | Mar. 6, 1956 |

UNITED STATES PATENT OFFICE
CERTIFICATE OF CORRECTION

Patent No. 3,056,947 October 2, 1962

Edwin I. Blumenthal et al.

It is hereby certified that error appears in the above numbered patent requiring correction and that the said Letters Patent should read as corrected below.

Column 9, lines 74 and 75, and column 10, lines 1 and 2, for '"fiill-in"', each occurrence, read -- "fill-in" --; line 23, for "rounted" read -- routed --; column 15, line 17, for "car" read -- card --; column 24, line 52, for "coil" read -- coils --; column 30, line 32, for "aplication" read -- application --; column 34, line 10, "in variant" read -- invariant --; line 13, after "record" insert -- card --.

Signed and sealed this 6th day of August 1963.

(SEAL)
Attest:

ERNEST W. SWIDER
Attesting Officer

DAVID L. LADD
Commissioner of Patents